US010552951B2

(12) United States Patent
Barrasso et al.

(10) Patent No.: US 10,552,951 B2
(45) Date of Patent: Feb. 4, 2020

(54) AUTONOMOUS PLANT GROWING SYSTEMS

(71) Applicant: Growtonix, LLC, Melville, NY (US)

(72) Inventors: Mark Emilio Barrasso, Melville, NY (US); Alexandru Serghei Rosca, Westwood, NJ (US); Jesse Dean Fordyce, Allston, MA (US); Patrick William Crawford, Blaine, WA (US)

(73) Assignee: GROWTONIX, LLC, Melville, NY (US)

( * ) Notice: Subject to any disclaimer, the term of this patent is extended or adjusted under 35 U.S.C. 154(b) by 578 days.

(21) Appl. No.: 15/183,053

(22) Filed: Jun. 15, 2016

(65) Prior Publication Data

US 2016/0371830 A1 Dec. 22, 2016

Related U.S. Application Data

(60) Provisional application No. 62/180,278, filed on Jun. 16, 2015, provisional application No. 62/288,863, filed on Jan. 29, 2016.

(51) Int. Cl.
*G06T 7/00* (2017.01)
*H05B 33/08* (2006.01)
*A01G 7/04* (2006.01)

(52) U.S. Cl.
CPC ....... *G06T 7/0004* (2013.01); *H05B 33/0872* (2013.01); *A01G 7/045* (2013.01); *G06T 2207/30188* (2013.01)

(58) Field of Classification Search
CPC ......... G06T 7/0004; G06T 7/11; G06T 7/136; G06T 2207/30188; H05B 37/0227;
(Continued)

(56) References Cited

U.S. PATENT DOCUMENTS 7,661,307 B1 2/2010 Milone
8,384,047 B2 2/2013 Shur et al.
(Continued)

FOREIGN PATENT DOCUMENTS

WO WO 2012104789 A1 8/2012
WO WO-2014188303 A1 * 11/2014 ............. A01G 7/045
(Continued)

OTHER PUBLICATIONS

Ayana Byrd, "This Glowing Purple Cube Is an Indoor Farm" www.fastcompany.com/3022514/reverse-engineered/this-glowing-purple-cube-is-an-indoor-farm, Dec. 4, 2013.
(Continued)

*Primary Examiner* — Amandeep Saini
(74) *Attorney, Agent, or Firm* — Brian R. Landry; Saul Ewing Arnstein & Lehr LLP

(57) ABSTRACT

One aspect of the invention provides a system including: a camera, one or more light sources, and a controller. The controller is programmed to: receive an image of one or more plants from the camera; apply a segmentation algorithm to produce a binary image from the image; apply a thresholding algorithm to classify the one or more plants within the binary image as being in one or several stages of plant life; and control operation of the one or more light sources based on a classified stage of plant life.

18 Claims, 35 Drawing Sheets

(58) Field of Classification Search
CPC ........ H05B 33/0872; G06K 9/00; A01G 7/00; A01G 27/003; A01G 7/045; Y02P 60/146
USPC ....................................................... 382/110
See application file for complete search history.

(56) References Cited

U.S. PATENT DOCUMENTS

| | | | |
|---|---|---|---|
| 8,858,012 | B2 | 10/2014 | Crabb et al. |
| 2007/0043527 | A1 | 2/2007 | Quan et al. |
| 2011/0173884 | A1* | 7/2011 | He .................... A01G 25/167 47/79 |
| 2012/0025695 | A1 | 2/2012 | Chen et al. |
| 2013/0006401 | A1 | 1/2013 | Shan |
| 2014/0376782 | A1* | 12/2014 | Li ........................ G06T 7/0012 382/110 |
| 2015/0011784 | A1* | 1/2015 | Aoki ...................... C10G 3/50 554/1 |
| 2015/0071541 | A1* | 3/2015 | Qutub .................. G06T 7/187 382/173 |
| 2015/0089866 | A1 | 4/2015 | Abbott et al. |
| 2015/0089867 | A1 | 4/2015 | Abbott et al. |
| 2015/0305258 | A1 | 10/2015 | Broutin Farah et al. |
| 2016/0088802 | A1* | 3/2016 | Nicole .................. A01G 7/045 47/58.1 LS |

FOREIGN PATENT DOCUMENTS

| | | |
|---|---|---|
| WO | WO 2015143110 A1 | 9/2015 |
| WO | WO 2015153691 A2 | 10/2015 |

OTHER PUBLICATIONS

Signe Brewster, "Grow a Garden in your Kitchen or create a new form of CSA with GrowCubes" https://gigaom.com/author/signejb/, Jan. 1, 2014.
Chris Beauvois, "GrowCubes—Engadget InsertCoin" https://www.youtube.com/watch?v=GO0M-IMrdQw, Oct. 10, 2013.
Adafruit, "Sensors/Liquid/Flow/12" eTape Liquid Level Sensor + extras, https://www.adafruit.com/products/464, downloaded Jan. 2016.
AmHydro, "Automation—Optimum Crop Performance", American Hydroponics, http://americanhydroponics.com/products/automation.html, downloaded Jan. 2016.
Bebis, "Thresholding", downloaded Jan. 4, 2016.
Cai, J., et al., "Novel Image Segmentation Based on Machine Learning and Its Application to Plant Analysis", International Journal of Information and Electronics Engineering, vol. 1, No. 1, Jul. 2011.
Carleton College, "Part 4—Measure Areas Using Thresholding" http://serc.carleton.edu/eet/measure_sat2/part_4.html, downloaded Jan. 4, 2016.
Christ, "Temporal and Spatial Patterns of Growth and Photosynthesis in Leaves of Dicotyledonous Plants Under Long-Term CO2- and O3-Exposure", Inaugural Dissertation, Gedruckt mit der Genehmigung der Mathematisch-Naturwissenschaftlichen Fakultat der Heinrich-Heine-Universitat Düsseld, 2005.
Computer Vision Group, Binary Image Segmentation, downloaded Jan. 4, 2016.
Correll, N. et al., "Indoor Robot Gardening: Design and Implementation", Intelligent Service Robotics 3.4: 219-232. Web, 2010.
Coupier, D., et al., "Image denoising by statiscal area thresholding", Universite Paris, Feb. 2008.
Cvonrosp, "Seven teams build apps at the DevNet Hackathon at Cisco Live", Developer, Jun. 2015.
Efford, "Image Segmentation", https://www.cs.auckland.ac.nz/courses/compsci773s1c/lectures/ImagePro . . . , pp. 1-10, downloaded Jan. 4, 2016.
Fisher, "Point Operations—Adaptive Thresholding", http://homepages.inf.ed.ac.uk/rbf/HIPR2/adpthrsh.htm, downloaded Jan. 4, 2016.
Ghosh, S., et al., "Machine Learning for Soil Fertility and Plant Nutrient Management using Back Propagation Neural Networks", International Journal on Recent and Innovation Trends in Computing and Communication, 2(2): 292-297, Feb. 2014.
Growtronix, "How Growtronix Works—Growtronix" https://www.growtronix.com/cart/blog/how-growtronix-works-n5, pp. 1-8, downloaded Jan. 5, 2016.
Jolly, J. "The Kitchen Garden Goes High Tech", The New York Times, http://well.blogs.nytimes.com/2015/05/19/the-kitchen-garden-goes-high-te . . . , downloaded Jan. 5, 2016.
Kaushal, S., et al., "Adaptive Crop/Plant Growth Assistance Learning Algorithm", IEEE Computer Society, 2015.
Kluszczynski, R., et al., "An Algorithm for Binary Image Segmentation Using Polygonal Markov Fields", LNCS 3617, pp. 383-390, 2005.
LEDs Magazine, "Precise LED wavelengths spur plant growth (Magazine)", http://www.ledsmagazine.com/articles/print/volume-8/issue-4/features/precise-led-waveleng . . . , downloaded Jan. 5, 2016.
Loomis, J., et al., "LeafAlone Hydroponics System", University of Central Florida, Senior Design 1, Apr. 2014.
Mathworks Image Thresholding—MATLAB, "Analyzing images using image thresholding techniques" http://www.mathworks.com/discovery/image-thresholding.html, downloaded Jan. 2016.
McNaughton, A., ImageJ Thresholding, "Measuring Area Using Thresholds", 2010.
Meyer, G. E., "Machine Vision Identification of Plants", Recent Trends for Enhancing the Diversity and Quality of Soybean Products, www.intechopen.com, Oct. 2011.
National Aeronautics and Space Administration (NASA), "LED Systems Target Plant Growth", Consumer Goods, Spinoff 2010.
National Aeronautics and Space Administration (NASA), Research and Technology 2003 Annual Report, "Plant Lighting System" 2003.
Navarro, P. J., et al., "Development of a Configurable Growth Chamber with a Computer Vision System to Study Circadian Rhythm in Plants", Sensors: 12, 15356-15375, 2012.
NIST, "Measurement of Percent Area", http://www.nist.gov/lispix/imlab/measure/pctarea.html, Jun. 2004.
Niwa, "The world's first smartphone-controlled growing system by Niwa . . . ", https://www.kickstarter.com/projects/435284672/niwa-the-worlds-first-s . . . , downloaded Jan. 5, 2016.
Niwa, "We build products that bring people closer to nature's best products", http://getniwa.com/niwaone.html, downloaded Jan. 5, 2016.
Niwa, "Update 18", https://www.kickstarter.com/projects/435284672/niwa-the-worlds-first-s . . . , downloaded Jan. 5, 2016.
Pothier, J., et al., "Team Purple: Final Report", May 2014.
Robarts, S., "Review: Click and Grow Smart Herb Garden", http://www.gizmag.com/click-and-grow-smart-herb-garden-review/35559/, pp. 1-8, May 2014.
Ruts, T., et al., "Aberrant temporal growth pattern and morphology of root and shoot caused by a defective circadian clock in *Arabidopsis thaliana*", The Plant Journal 72:154-161, 2012.
Ruzin, "Thresholing and the Region of Interest", Thresholding, http://microscopy.berkeley.edu/courses/dib/sections/03IPII/ROI.html, pp. 1-3, downloaded Jan. 2016.
Schmidt, W., "Guaranteed, CounterCrop Will Give you a 'Green Thumb'", TECHCO, http://tech.co/countercrop-disrupting-food-cycle-2015-01, pp. 1-7, downloaded Jan. 4, 2015.
Shibghatallah, M. A. H., et al., "Measuring Leaf Chlorophyll Concentration from Its Color: A Way in Monitoring Environment Change to Plantations", arXiv:1305.1148v2 [physics.bio-ph], Jul. 2013.
Walter, A., et al., "Dynamics of seedling growth acclimation towards altered light conditions can be quantified via GROWSCREEN: a setup and procedure designed for rapid optical phenotyping of different plant species", New Phytol. 174(2): 447-55, 2007.
Wiese, A., et al., "Spatio-temporal leaf growth patterns of *Arabidopsis thaliana* and evidence for sugar control of the diel leaf growth cycle", New Phytolotgist 174: 752-761, 2007.
Wikipedia, "Binary Image", https://en.wikipedia.org/wiki/Binary_image#Image_segmentation, downloaded Jan. 2016.
Wikipedia, "Grow light", https://en.m.wikipedia.org/wiki/Grow_light, downloaded Jan. 2016.

(56) References Cited

OTHER PUBLICATIONS

Wikipedia, "Watershed", https://en.wikipedia.org/wiki/Watershed_(image_processing), pp. 1-5, downloaded Jan. 2016.
Williams-Sonoma, "Ready, Set, Grow!", New & Exclusive AeroGarden Bounty Elite Kit, https://mail.google.com/mail/u/0/?ui=2&ik=5602ccal85&view=pt&searc . . . , Jan. 20, 2016.
Yin, Y., "Binary Image Segmentation Using Graph Cuts", pp. 1-10, downloaded Jan. 4, 2016.
LEAF: The automatic cannabis grow system, "Growing Your Own Cannabis Has Never Been Easier," www.getleaf.co, retrieved Jun. 16, 2015, pp. 1-14.

* cited by examiner

Nutrient Level Enable

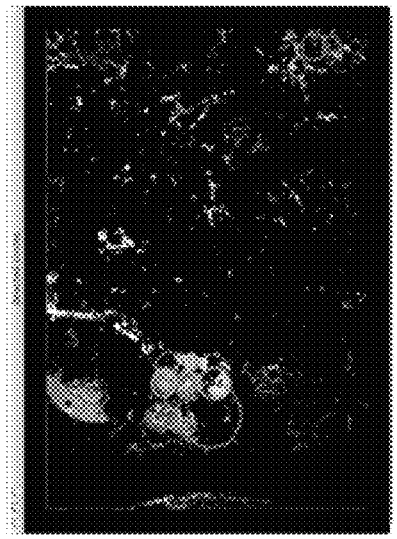
FIG. 35
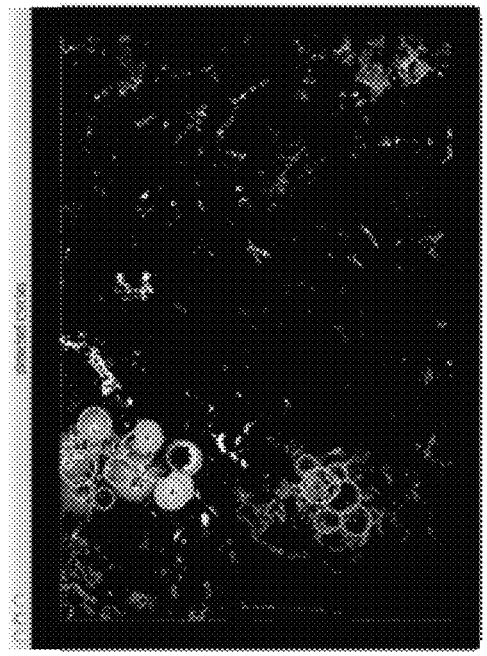
FIG. 36
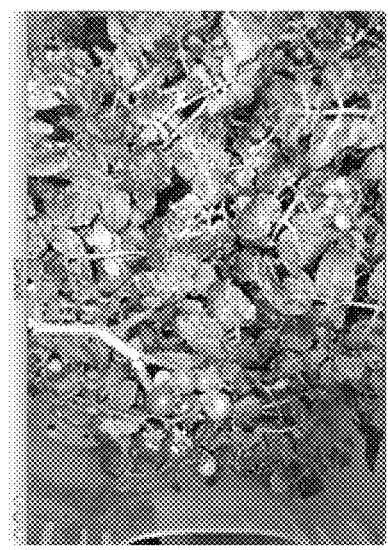

AUTONOMOUS PLANT GROWING SYSTEMS

CROSS-REFERENCE TO RELATED APPLICATIONS

This application claims priority under 35 U.S.C. § 119(e) to U.S. Provisional Patent Application Ser. 62/180,278, filed Jun. 16, 2015, and U.S. Provisional Patent Application Ser. 62/288,863, filed Jan. 29, 2016.

BACKGROUND OF THE INVENTION

Growing plants requires time, space, and expertise. The plant must be watered every day and the soil needs to be cultivated. Knowing how and when to do this requires experience. Taking care of plants is rewarding but manual caretaking is prone to failure.

SUMMARY OF THE INVENTION

One aspect of the invention provides a system including: a camera, one or more light sources, and a controller. The controller is programmed to: receive an image of one or more plants from the camera; apply a segmentation algorithm to produce a binary image from the image; apply a thresholding algorithm to classify the one or more plants within the binary image as being in one or several stages of plant life; and control operation of the one or more light sources based on a classified stage of plant life.

This aspect of the invention can have a variety of embodiments. The controller can be further programmed to control operation of the one or more light sources to apply more blue light than red light during an early stage of plant life. The early stage can be selected from the group consisting of: planted, sprouted, and growing. The blue light can include a wavelength of about 450 nm.

The controller can be further programmed to control operation of the one or more light sources to apply more red light than blue light during an late stage of plant life. The late stage can be selected from the group consisting of: flowering, fruiting, and ripe. The red light can include a wavelength of about 650 nm.

The controller can be further programmed to control the one or more light sources to expose the one or more plants to darkness. The controller can be programmed to control the one or more light sources to generate a high ratio of red light prior to the darkness. The controller can be programmed to control the one or more light sources to generate a low ratio of red light after the darkness.

The one or more light sources can include one or more blue LEDs and one or more red LEDs.

The segmentation algorithm can be a binary segmentation algorithm. The binary segmentation algorithm can be Otsu's method. The binary segmentation algorithm can be a watershed method.

The system can further include one or more pumps adapted and configured to apply one or more fluids to the one or more plants. The controller can be further programmed to control one or more pumps based on the classified stage plant life. The system can further include a flood tray in communication with the one or more pumps, the flood tray adapted and configured to receive the one or more plants and the one or more fluids.

The controller can be further programmed to send alerts to a user. The alerts can relate to needed user interventions. The alerts can include alerts regarding low fluid levels. The alerts can be directed to a user's smartphone.

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

FIGS. 7 and 8 depict schematics of a central embedded system implemented on an INTEL® EDISON board for automation of the grow unit 100 interfaces with the real world according to an embodiment of the invention. FIGS. 9 and 10 depict schematics for autonomous plant growing systems according to embodiments of the invention.

FIGS. 35 and 36 depict tests of segmentation, classification, and fruit detection algorithms according to embodiments of the invention.

DEFINITIONS

Figure 1A:
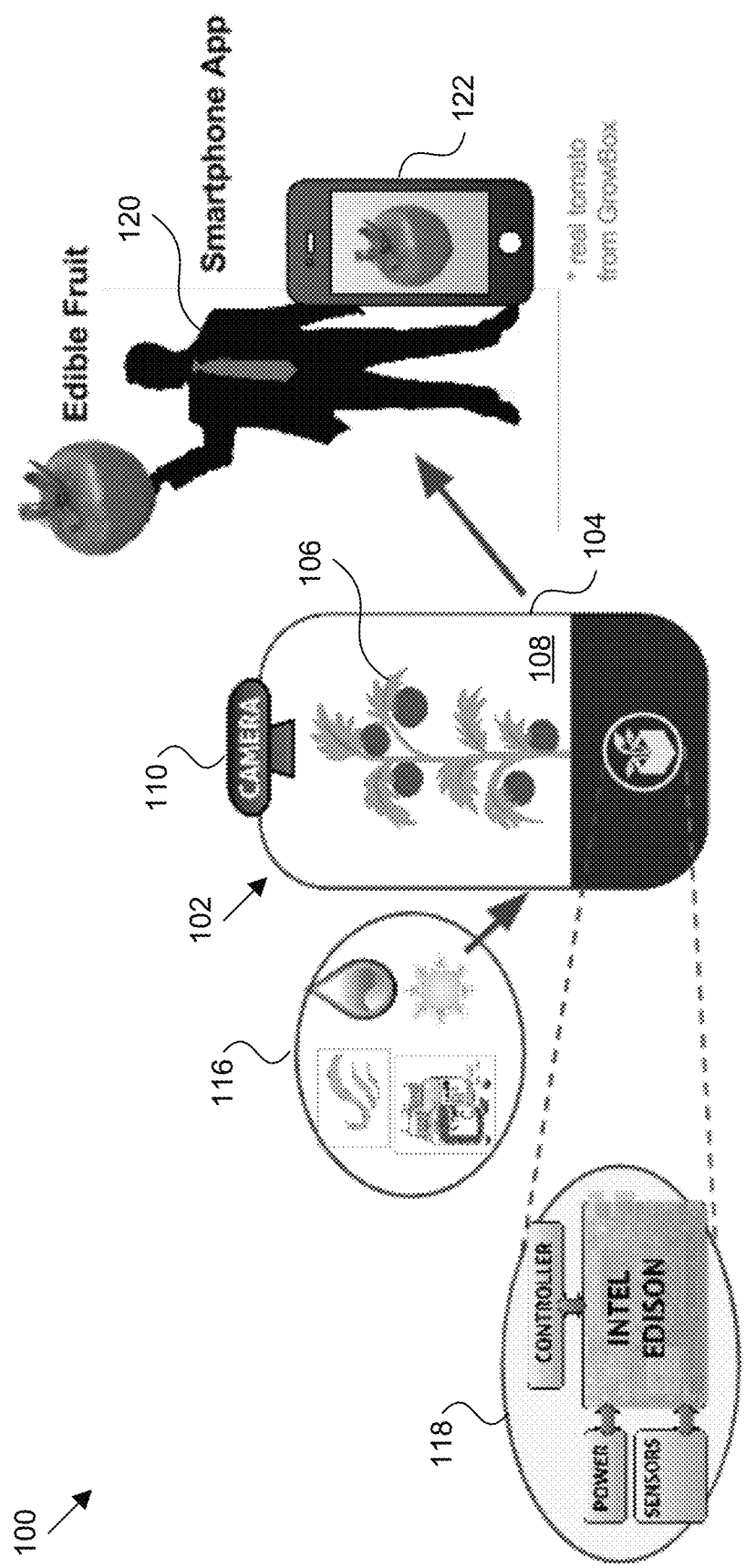
FIGS. 1A and 1B provide an overview of a system 100 according to an embodiment of the invention.

The instant invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

DETAILED DESCRIPTION OF THE INVENTION

One embodiment of the invention provides an entirely autonomous plant growing box. In one embodiment, the user only needs to add water and nutrients when prompted by the app.

One of the biggest problems worldwide is availability of food. 11.3% of the world's population is malnourished. Additionally, most people in the world take on poor working conditions just to be able to feed themselves and their families. This prevents people from living their lives to the fullest and engaging in activities they believe to be both important and enjoyable. This problem impedes worldwide progress.

Growing produce is currently limited by outdoor space, seasons, time, and human labor. Embodiments of the invention use automated hydroponics to provide an accelerated, soilless method of growing plants that works year round. This would reduce cost by growing plants faster year-round, using less water and labor.

Embodiments of the invention can drive a paradigm shift that would allow for globalization of automated food production. Development of a system that can grow a single plant automatically would be beneficial as it would produce a marketable product as well as a scalable plant growing technology.

Challenges associated with automatically growing a plant involve plant environment control and plant diagnosis. A plant requires specific lighting at different stages of its life. It also requires different combinations of nutrients. The challenge is to be able to detect the stage of life in the plant and alter its environment according to predefined metrics. The progress and health of the plant must be determined as well to ensure the plant is growing properly.

Embodiments of the invention can grow a plant from seed to fruiting maturity at any time of the year. Embodiments of the invention provide an efficient, effective, rapid, and autonomous plant growing system. Some embodiments of the invention require no more than one hour of interaction per week. Additionally, all required user actions, such as replenishing water to the system, can be communicated via a smartphone application with instructions anyone can understand.

Embodiments of the invention are particularly well-suited to growing fruiting plants, but can also be applied to non-fruiting plants.

Home grown vegetables are both rewarding to see mature and are healthier to consume than most store bought variants. In some embodiments, the user need only plug the system into the wall and be given clear operation instructions. In some embodiments, the user can see his/her plant for aesthetic value.

Taking care of plants is rewarding and growing produce at home allows users to control which chemicals are used in growing the produce. Manual caretaking, however, is prone to failure. Embodiments of the invention eliminate this concern by providing complete automation of the growing process. Embodiments of the invention include a hydroponic system that delivers nutrients to the plants.

Embodiments of the invention utilize a central controller (e.g., an INTEL® EDISON™ computer-on-module board manufactured and/or sold by Intel Corporation of Santa Clara, Calif.) to reference a plant profile for parameters of the system based on the plant's stage of life. Any grow unit could accommodate multitudes of types of plants by loading different plant profiles. Data in the plant profile can be stored by stage of plant life. The controller can take pictures of the plant and execute image processing software to determine its stage of life. This relieves the user of the time and expertise traditionally required by growing plants. The system can be designed to only require a refill of water and nutrients. To make it simple for the user, embodiments of the invention can be supplemented by a mobile smartphone app that serves as the user interface (UI). The app can update the user via push notifications with any information regarding the plant, provide persistent information on the environment of the plant, send commands such as "toggle lights" and "feed the plant" in the event that the user chooses to override the automation process, and allow the user to share their plant over social media. This two-way communication from the app to the controller can be facilitated through the cloud.

Embodiments of the invention provide an Internet-of-Things-enabled device that can be controlled and viewed from anywhere in the world, but if left alone it will successfully grow vegetables such as tomatoes just by adding water.

Features of the invention include: (i) algorithms for supporting plant life for every stage of life from germination to fruiting maturity, including delivering proper amounts of water and nutrients to the plant based on its stage of life, (ii) a system of sensors and actuators that collects data to accurately modify parameters of the tomato plant's environment such as water levels, nutrient solution electric conductivity, humiture, etc., which will keep each parameter within an acceptable range as determined by public records of plant growth, (iii) a dynamic light array that delivers an effective amount of Photosynthetic Active Radiation (PAR) (defined as radiation between 400 and 700 nm in wavelength) that can sustain one tomato plant in every stage of plant life from germination to fruiting maturity, (iv) an algorithm for evaluating the stage of life of the plant currently occupying the box, and (v) an interactive user interface that can control functions in the box, as well as give the user information about what's happening with their plant.

Controlled by the controller board, embodiments of the contains a fully functional, dynamic, and automatic "ebb and flow" hydroponic system requiring no more user input than up to 2 gallons (128 fluid ounces) of water per week and up to a cup (8 fluid ounces) of each type of nutrient every 2 months, which can sustain one tomato plant in every stage of plant life from germination to fruiting maturity.

Embodiments of the invention include an electric conductivity (EC) meter, two types of water level sensors, and a humiture sensor. These sensors can be polled by the controller board, which then can transmit commands to the actuators, which can include water pumps for flooding and transferring water, peristaltic pumps for delivering and mixing nutrients, and one or more light arrays.

An LED array can provide the plant with the necessary lighting conditions for growth. One embodiment of the invention uses different colored LEDs whose power output will change depending on the data taken from the image processing in order to increase the speed of growth.

Embodiments of the invention include image processing software running on the controller board that uses images taken by a camera in the box to differentiate between the stages of plant life between germination and fruiting maturity of a tomato plant, depict which stage the plant currently growing in the box is in, and, for example, accurately deduce the number of bearing fruits the tomato plant currently has.

Through the controller board, the box can communicate with and be controlled by a mobile smartphone application, which can notify the user when his input is required, displays plant statistics, and delivers commands from the user such as instantiating pump cycles or toggling lights.

System Overview

Figure 1B:
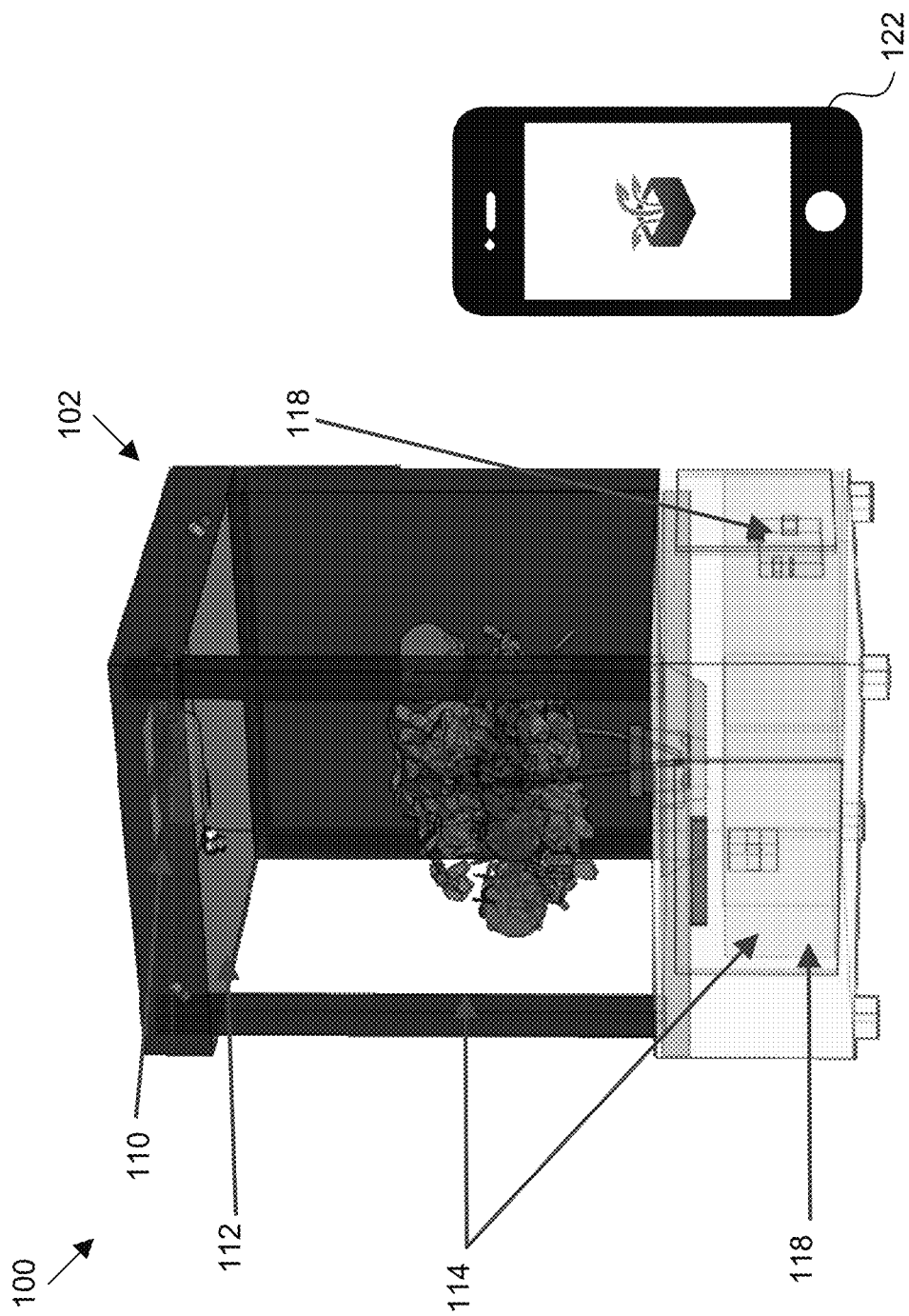

FIGS. 1A and 1B provides an overview of a system 100 according to an embodiment of the invention. A grow unit 102 provides an enclosure 104 to shelter one or more plants 106 within a controlled environment 108, hold one or more cameras 110, lights 112, and sensors 114, store one or more supplies 116, and house one or more control devices 118.

Grow unit 102 can communicate with a user 120 through one or more interfaces such as a graphical user interface on the grow unit 102, audio and/or visual signals (e.g., lights and/or sound), through one or more peripherals, and the like. In one embodiment, the grow unit 102 communicates with the user 120 through an app on a user's smartphone 122 (e.g., via communication over a network).

Plant Support System

Hydroponic System

Figure 2:
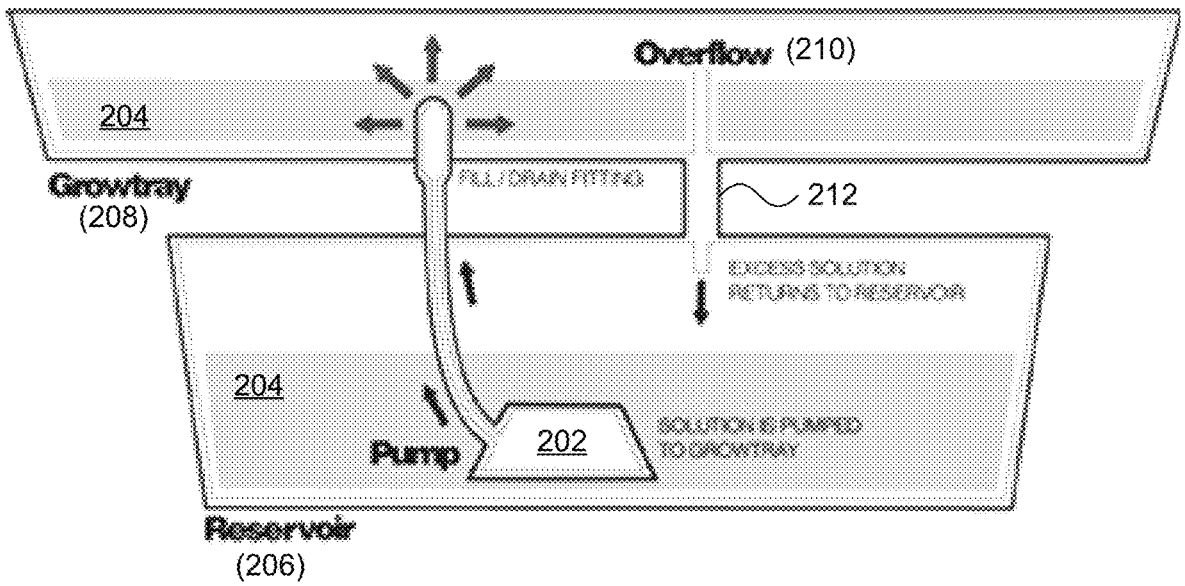
FIG. 2 depicts a hydroponic system 200 for providing water and nutrients to the plant(s) according to an embodiment of the invention.

Referring now to FIG. 2, some embodiments of the invention utilize a hydroponic system 200 for providing water and nutrients to the plant(s). A pump 202 moves a nutrient solution 204 from a mixing reservoir 206 into a grow tray (flood tray) 208 where the plants sit. The grow tray 208 includes an overflow spillover 210 that is elevated from the base of the grow tray 208 so that any excess solution 204 returns to the reservoir 206.

Depending on the stage of life of the plant(s), the hydroponic system 200 can flood the grow tray 208 between 3 and 6 times a day for 20-30 minutes. Once the solution 204 floods up to a certain point, it will drain back down through the overflow tube 212 back into the mixing reservoir 206. The solution 204 can circulate for the entirety of the flood time. The number of floods per day, the length of floods, and the amount of nutrients in the solution 204 can each increase with the size of the plant.

Figure 3:
FIG. 3 depicts exemplary fittings for a hydroponic system according to an embodiment of the invention.

The system can also include reservoirs for water and one or more nutrients, e.g., the Grow, Micro, and Bloom liquid nutrients from Advanced Nutrients of Abbotsford, British Columbia. ½ cup (4 fluid ounces) (e.g., RUBBERMAID®) containers were used for each type of nutrient and a 21 cup (168 fluid ounces) container held the water. The mixing reservoir was a container holding 16 cups (128 fluid oz). The nutrients were pumped 1-4 mL at a time using 12 V DC peristaltic pumps to the mixing reservoir through 2 mm ID, 5 mm OD, rubber tubing. Water was pumped from the water reservoir through a 5/16" ID, ½ "OD rubber tube using a 12 V DC aquarium pump that resides in the water reservoir. Another 12 V DC aquarium pump resided in the mixing reservoir 206 and was used to fill the flood tray using the same tubing. Flood and flow fittings like the ones shown in FIG. 3 were used in the flood tray 208 as receptacles for this tubing.

All tubing was connected to a hole drilled into the lid of each container using 100% silicon, aquarium-safe adhesive making all of the reservoirs water tight. All of the containers and tubing was FDA-approved, food-grade material.

Each reservoir can include a sensor that the controller can sample or poll to determine how much liquid resides in the given reservoir. These values can govern when the pumps are allowed to pump. For example, aquarium pumps should not run dry, so there must be a minimum level of water or nutrient solution in order for them to be able to pump. Adequate fluid levels are particularly important for the mixing reservoir pump, because the system must be able to both fill the flood tray 208 to the overflow height and still have enough fluid to maintain circulation. Push notifications can be sent to the user's smartphone 122 to promote maintenance of adequate fluid levels.

Lighting System

Figure 4:
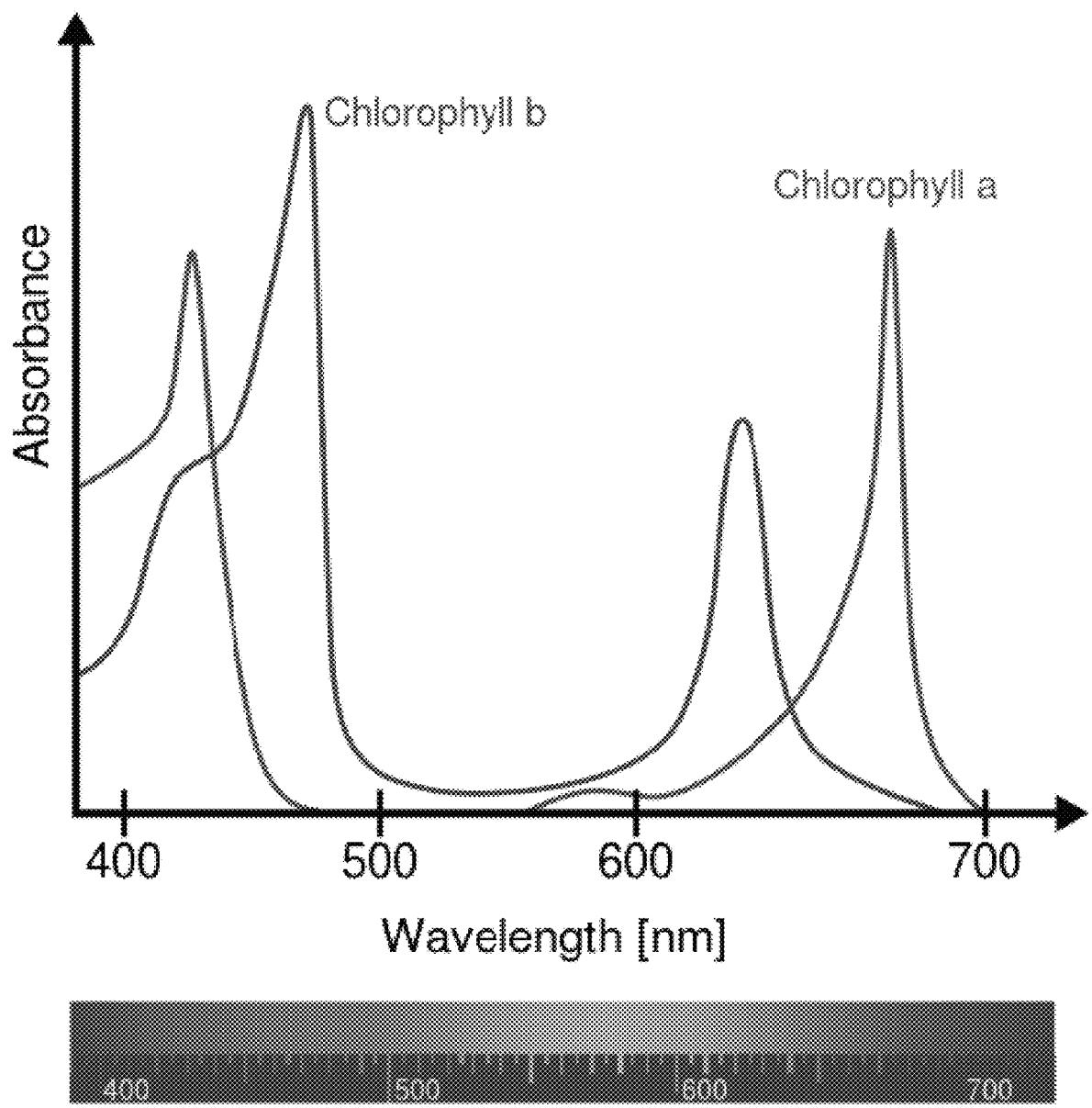
FIG. 4 depicts optimum wavelengths of light for chlorophyll a and chlorophyll b.

Plants also require light for sustenance. Plants contain multiple types of pigment that absorb sunlight for photosynthesis, such as chlorophyll a and chlorophyll b. Each of these pigments have optimum wavelengths of light for absorption as seen in FIG. 4.

Embodiments of the invention utilize color-specific LEDs to administer light with maximum efficiency For example, one embodiment of the invention uses 450 nm (or royal blue) light for high energy peaks and 650 nm (or deep red) light for lower energy peaks. Other embodiments of the invention use 474, 664, 666, 676, and/or 688 nm light.

Plants require more red light than blue light. A plant under a large amount of blue light will create more biomass in general, whereas a plant under a relatively high concentration of red light will have superior fruit production. Adjusting the light ratios and intensities as the plant grows can accelerate and optimize that plant's growth. Having a large amount of blue light during the early stages will increase the biomass to produce a stronger plant for the flowering and fruiting stages. After those stages, embodiments of the invention can increase the amount of red light relative to blue light, which will allow for a higher yield of fruit. These changes simulate the changes of seasons that a plant undergoes when growing outdoors.

Amounts, proportions, ratios, and other measurements of light or spectral components of light (e.g., blue light and red light as further discussed herein) can be defined in terms of a variety of radiometry units such as: radiant energy measured in joules (J), radiant energy density measured in joules per cubic meter (J/m), radiant exposure (also known as radiant fluence) measured in joules per square meter (J/m$^2$), spectral exposure (also known as spectral fluence) measured in joules per square meter per hertz (J·m$^{-2}$·Hz$^{-1}$), and the like.

Amounts, proportions, ratios, and other measurements of light or spectral components of light (e.g., blue light and red light as further discussed herein) can be additionally or alternatively be defined in terms of the number of LEDs or other lighting elements actuated at a given time or for a given duration. For example, a high ratio of red light can be produced by actuating lighting elements such that at least 75% of actuated lighting elements emit red light. Likewise, a low ratio of red light can be produced by actuating lighting elements such that 25% or less of actuated lighting elements emit red light.

Embodiments of the invention can simulate the outdoor growing environment as closely as possible in order to induce flowering. Another way to stimulate flowering is to (i) expose the plant to a high ratio of red light relative to other light components, then (ii) turn the lights off to expose the plant to complete darkness for a period of about 36 hours, and then (iii) expose the plant to a low red ratio of light relative to other light components. This is a signal to the plant that seasons are changing and flowering should begin.

One exemplary embodiment of the invention implements a grow stage for the exemplary Red Robin tomato plant utilizing an 18-6, on-off ratio for hours in the day. Typically, the lights in the box are turned on at 6 AM and turned off at midnight. This is the high blue ratio (relative to other light components) phase of growing. Once the image processing determines that sufficient leaf area is reached, i.e. biomass produced, for the plant to sustain bearing fruits, 36 hours of darkness is implemented. After this transition into the flowering phase, the lights produce a higher concentration of red light and turn to a 12-12 hour ratio to simulate the days shortening, thus suggesting the plant start growing tomatoes.

Figure 5:
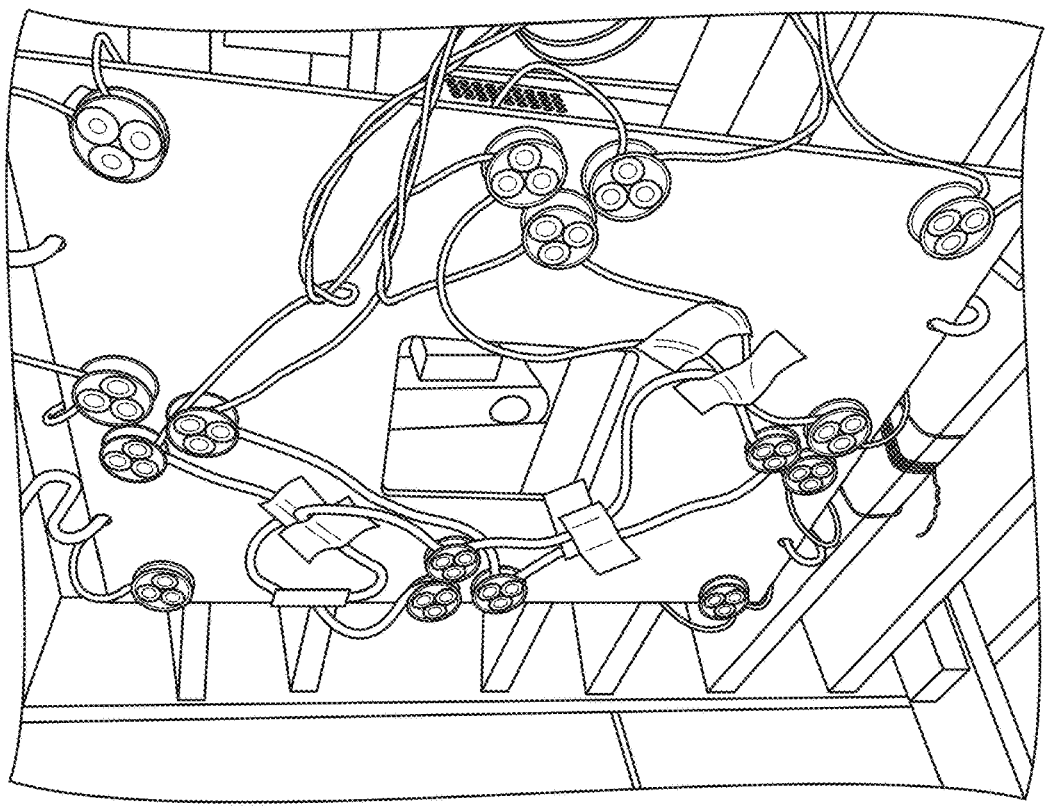
FIG. 5 depicts a lighting array according to an embodiment of the invention.

In one embodiment depicted in FIG. 5, the lighting array contains 4 blue LEDs, 8 red LEDs, and 4 white LEDs. An adjustable ratio of blue and red light can be presented if desired for a plant and situation. Each color bank (i.e., blue, red, and white) can include a plurality of LEDs in series that can be driven by an LED driver. In such an embodiment, only three LED drivers are required (one for each of the colors of light). This enables the most variation in light for our plants. The brightness of each LED can be controlled by a pulse-width-modulated signal sent to the control pin of the driver. The LEDs can be spread symmetrically on an array mounted 1'6" above the base of the plant. In one embodiment, the array outputs approximately 10 Watts per square foot, sufficient for growing 5 plants in an original 1.5'×1.5'×1.5' prototype.

Figure 6:
FIG. 6 depicts illumination of a tomato plant using the lighting array depicted in FIG. 5 according to an embodiment of the invention.

FIG. 6 depicts illumination of a tomato plant using the lighting array depicted in FIG. 5.

Controller System

Figure 7:
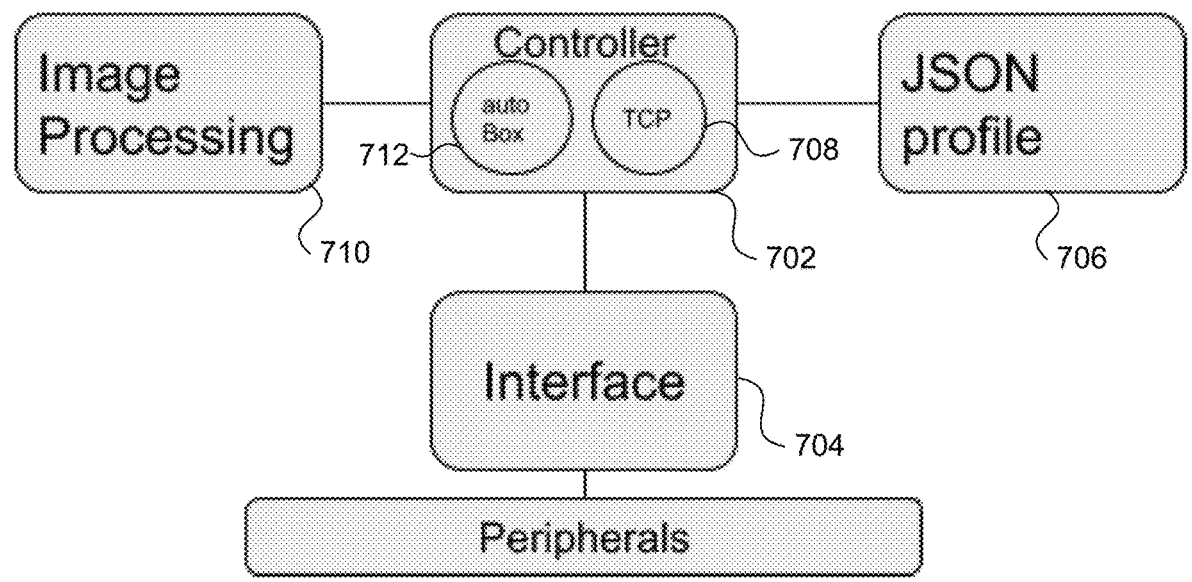
FIGS. 7-10 provide an overview of a controller system and its connection to other components according to an embodiment of the invention.
Figure 8:
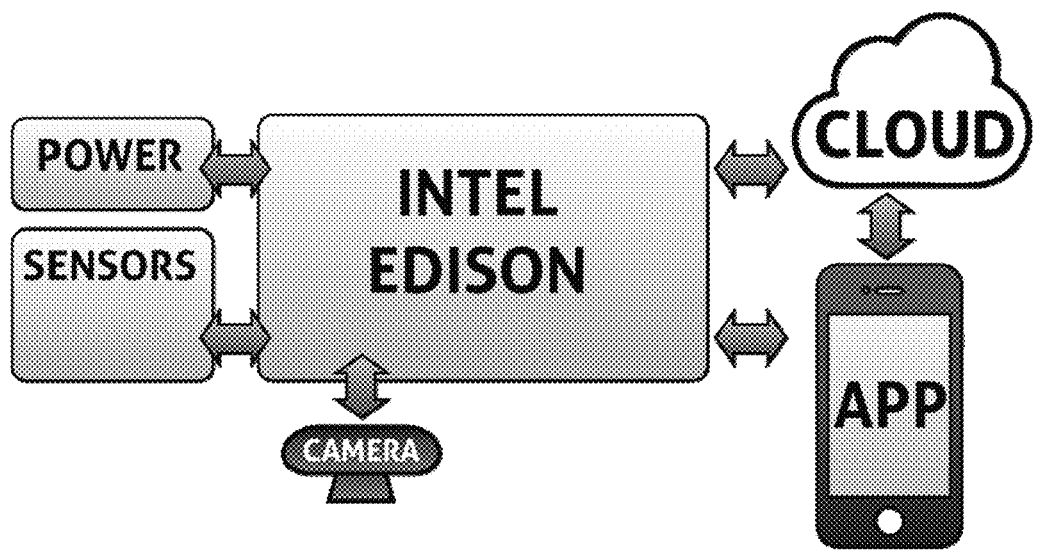
Figure 9:
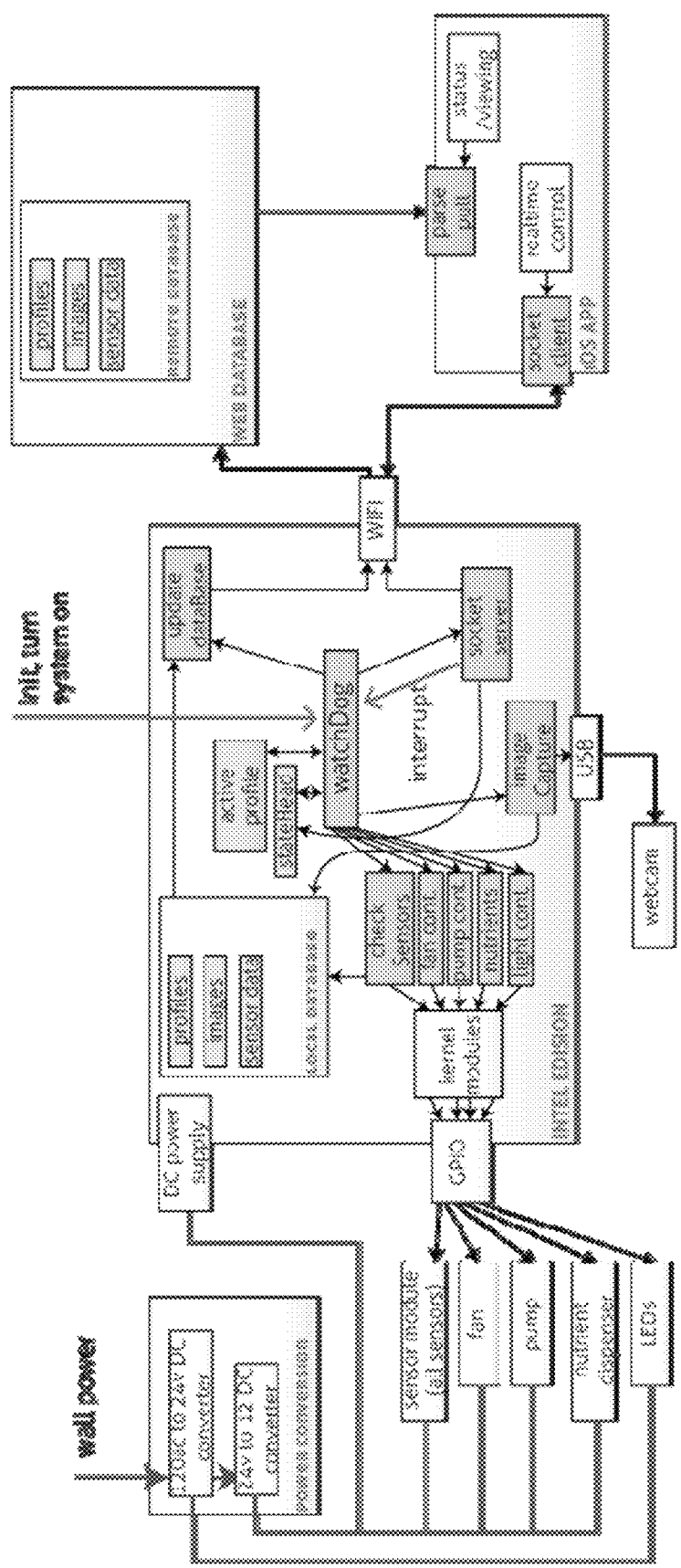
Figure 10:
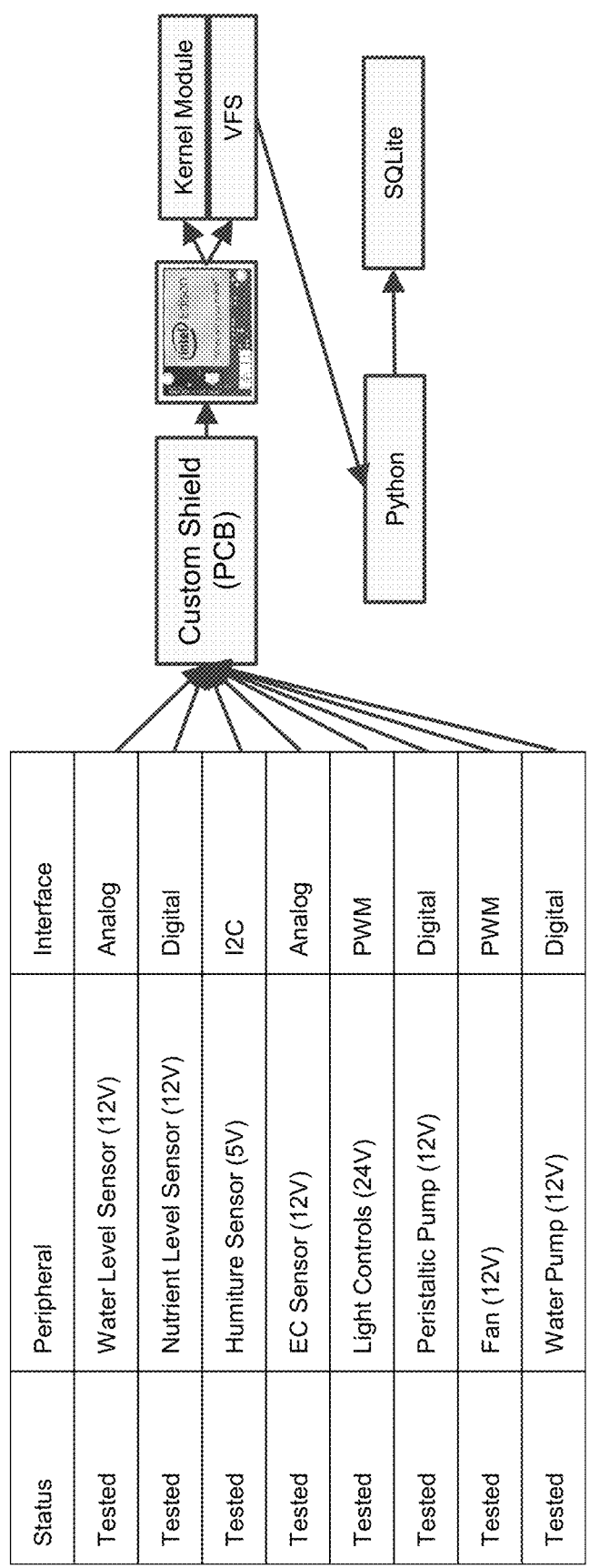

Referring now to FIGS. 7 and 8, in one embodiment of the invention, a central embedded system implemented on an exemplary controller board implements automation of the grow unit 100 interfaces with the real world. The controller system can include a controller 702 and an interface 704.

The controller can contain both program logic for the automation of plant care and a handler for events received from the app. The program logic and the event handler can be implemented as separate threads.

The automation software can schedule system actions according to a profile. The profile data can be stored in a JSON file 706 and include instructions and/or parameters for operation of the lights, pumping system, and nutrition pumps.

The interface 704 can control hardware peripherals such as pins directly. Communication between the interface 704 and the controller 702 can occur via a local socket connection. The controller 702, upon starting up, can instantiate a TCP server 708. The controller 702 can then spawn a process for the interface 704 that connects to the TCP server 708 as a client. Commands can then be passed to the interface 704 and appropriate information can be sent back. An image processing component 710 can also communicate to the controller 702 in this way.

An overview of the controller system and its connection to other components provided in FIGS. 7-10.

Automation can be accomplished first by reading the JSON profile 706 to gather the lighting schedule, light color ratios, flooding schedule, nutrient amounts and/or ratios, and nutrient solution volume. Then, a component 712 can insert the next wake up event for the lights and the flooding into a data structure that orders the entries by wake up time. In one embodiment, nothing can be scheduled for more than 24 hours into the future. Time-to-wait can then be calculated using the current time and next scheduled time and the thread can sleep for that amount of time. When the system wakes up, it can run all the actions that were scheduled for that time.

Figure 22:
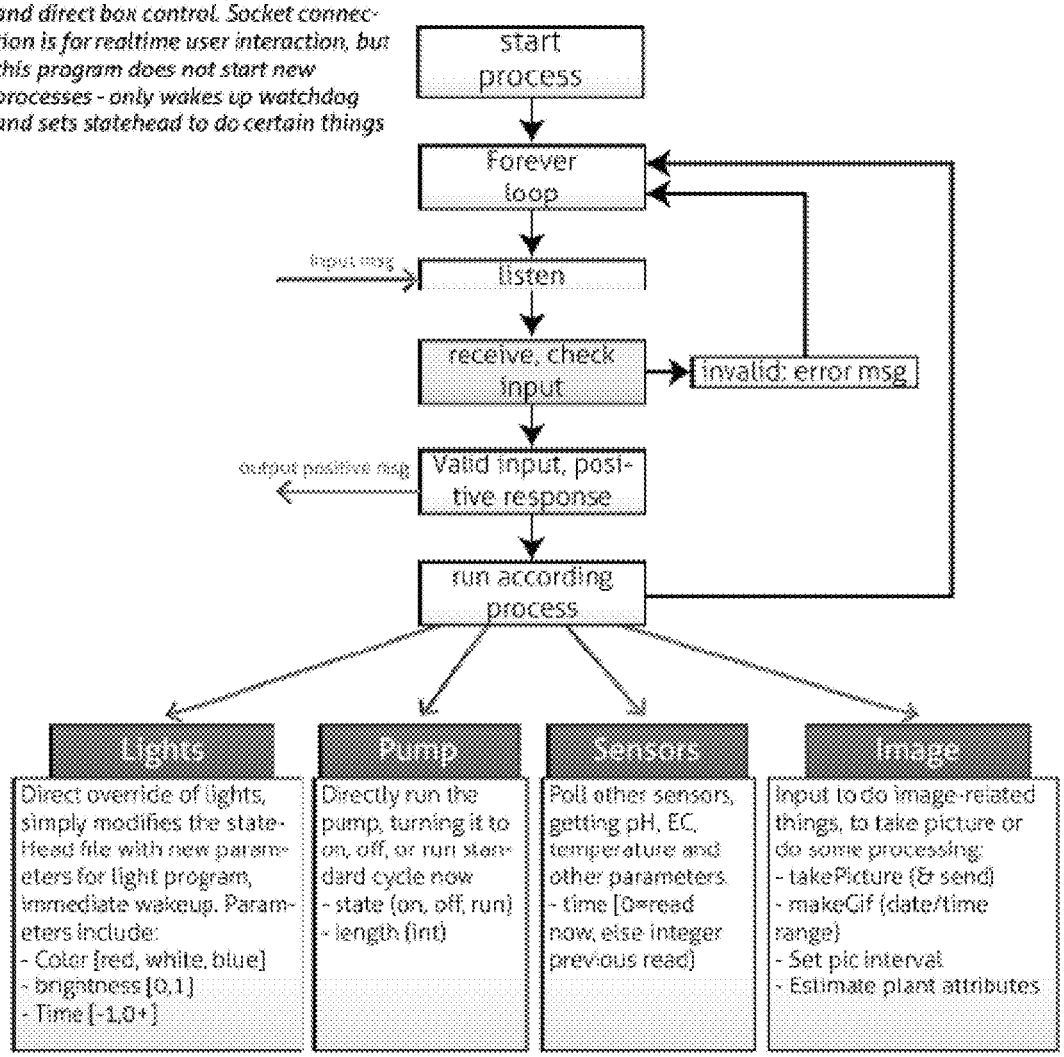
FIG. 22 depicts an algorithm for handing messages received at a socket server according to an embodiment of the invention.

Handling of user input can be implemented through the use of a socket client, which connects the box to the cloud through the Internet. Messages can be parsed and the respective action can be carried out as depicted in FIG. 22.

Light controls can be automatic or manual. If the command originated from the cloud, automation is suspended and the lights are immediately set to the requested configuration. The lights are now in the manual state and can be set to the automatic state upon user request. Otherwise, if the command came from component 712, the light settings for the current time can be read from the profile and set unless it is in the manual state. In either case, if the lights need to be adjusted, the component 712 can format the settings into a message according to Table 1 below and send it to the interface 704. The interface 704 can parse the message and set the PWM on the pins for the light.

TABLE 1

Grow Unit Application Programming Interface

| Commands | Code | Options | Returns |
|---|---|---|---|
| Toggle lights on/off | l: | 0/1 | acknowledgement |
| Change light color | l: | r:b:w (%) | acknowledgement |
| Toggle water pump on/off | w: | 0/1(flood vs. water):xx:xx(L) | acknowledgement |
| Pump with peristaltic pumps | p: | x(which pump):xx:xx(mL) | acknowledgement |
| Read water reservoir level | t: | Nil | waterLevel = (0/1/2) |
| Read mixing reservoir level | r: | Nil | mixingLevel = xx:xx(L) |
| Read nutrient levels | n: | Nil | micro:grow:bloom = (0/1/2) |
| Read humiture | h: | Nil | temp:humidity = (xx.xx:xx.xx) |
| Quit program | q: | Nil | acknowledgement |

Flooding can be controlled the same way as the lights. For example, flooding can be automatically or manually controlled. When the system is instructed to flood the flood tray to provide the plant with water and nutrients, it can first check to see if there is enough water. This can be done by sending a message to the interface requesting the fluid level in the mixing reservoir to ensure there is enough solution to pump. If the fluid level is sufficient, the interface can be commanded to turn the pump on. If not, nutrients and water must be added.

The amount of nutrients consumed by the plant(s) can be determined through interface 704 reading an electric conductivity (EC) sensor from the EC sensing circuit. Based on the EC reading and amount of water to be added, the system adds nutrients and water. Once again, instructions are sent to the interface to do this.

Figure 11:
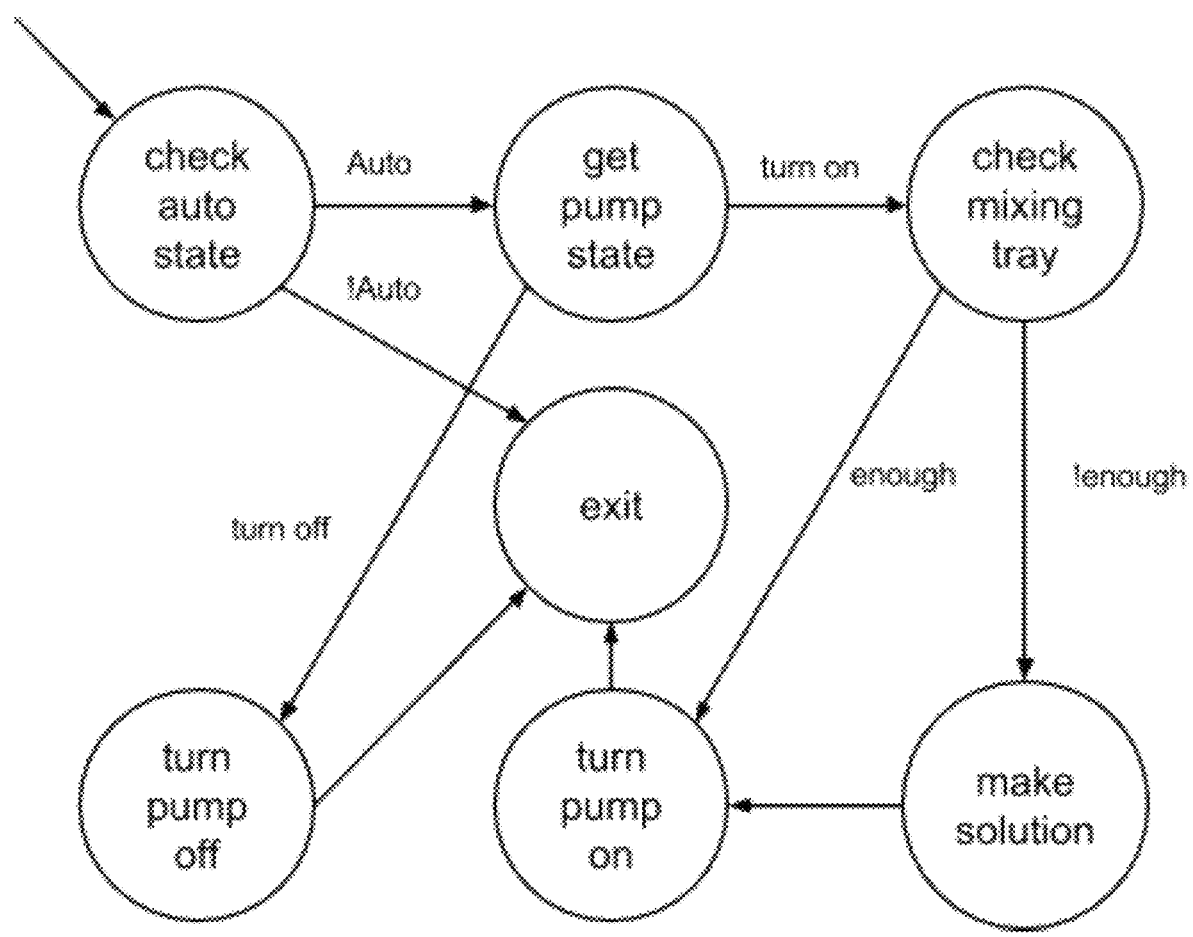
FIG. 11 depicts an algorithm for controlling pumps according to an embodiment of the invention.

For each nutrient type, the system can include a peristaltic pump that delivers the nutrients to the mixing reservoir. For the water, there is a 12 V pump that pumps water into the system. The flow rate of each pump can be programmed into the interface for accurate pumping. Once the solution is ready, the system can activate a pump to flood the flood tray. The same 12 V pump can be used. If any of the reservoirs are low after making the solution, a message can be sent through the cloud to the app to prompt the user 120 to add water or nutrients. This process is shown in FIG. 11.

Electronics System

The peripherals for the system can be controlled and powered with two printed circuit boards (PCBs). Circuits for the pumps and sensors can be on the breakout board, and circuits for the lights and power can be on the power and light board. In one example, both of the boards can be stacked on top of the INTEL® EDISON™ ARDUINO® Breakout Board and connect the pins to their respective circuits. The pin assignment is shown in Table 2 below.

TABLE 2

Pin Assignments

| INTEL® EDISON™ Pin | Function |
|---|---|
| 0 | Grow Peristaltic Pump Enable |
| 1 | Micro Peristaltic Pump Enable |
| 2 | Blood Peristaltic Pump Enable |
| 3 | Red Light |
| 4 | Nutrient Level Sensor Enable |
| 5 | Blue Light |
| 6 | White Light |
| 7 | Grow High Level |
| 8 | Grow Low Level |
| 9 | Micro High Level |
| 10 | Micro Low Level |
| 11 | Bloom High Level |
| 12 | Bloom Low Level |
| 13 | Flood Pump |
| 14 | Mixing Reservoir Level |
| 15 | EC Sensor Analog Input |
| 16 | Water Pump |
| 17 | Fan Enable |
| 18 | I2C SDA |
| 19 | I2C SCL |

Figure 12:
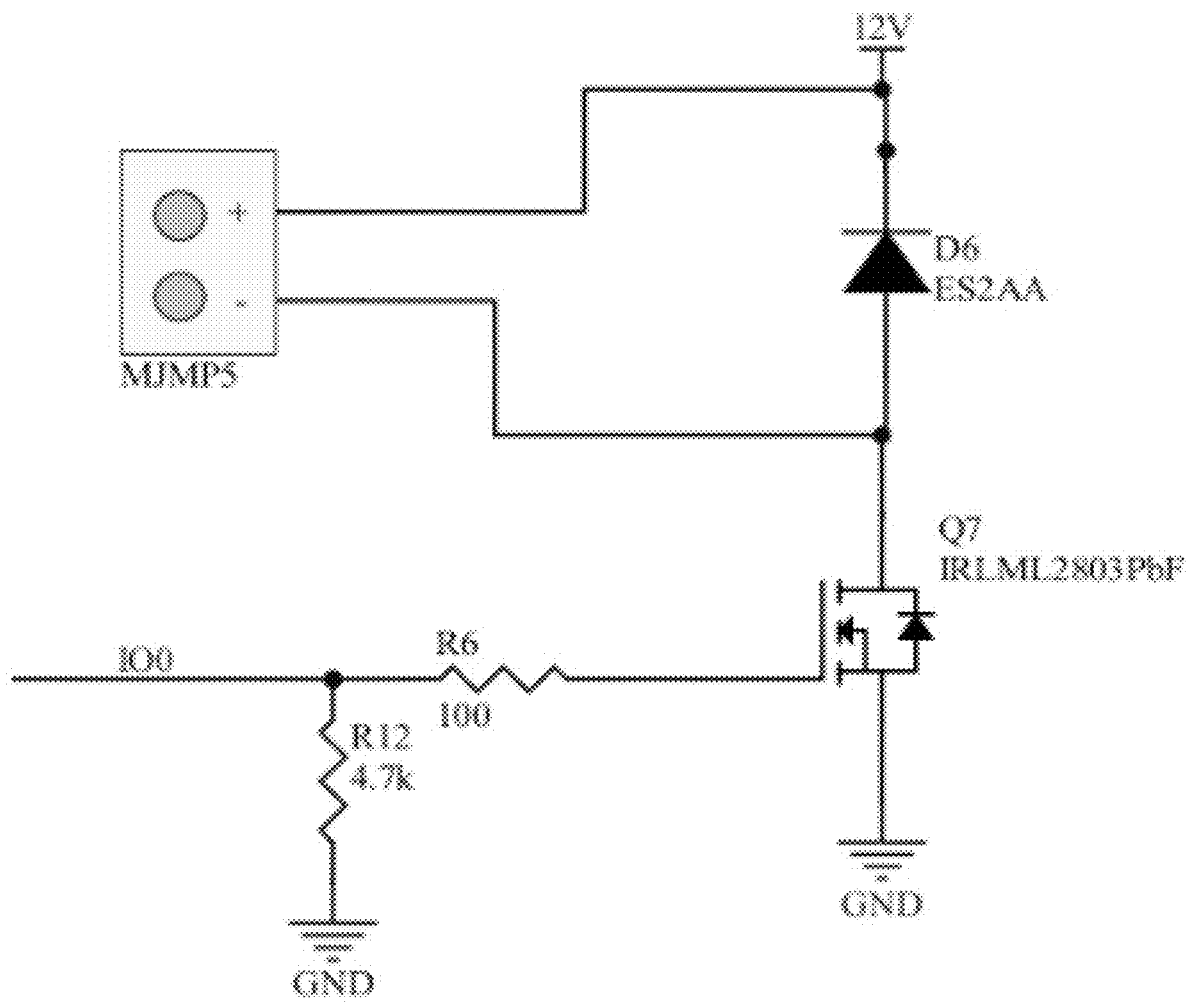
FIG. 12 depicts a motor driver circuit according to an embodiment of the invention.

The circuit shown in FIG. 12 is the motor driver circuit. It drives the 3 peristaltic pumps, the 2 water pumps, and the fan. The control can be driven by an IO pin that turns an NMOS (N-type metal-oxide-semiconductor) transistor either ON or OFF. The resistor labeled R12 can be a pull-down resistor to default the transistor to OFF. A 4.7K resistor was used, as it is a standard value for this feature. The resistor R6 can serve as a current limiter so if there was ever to be any current coming from the transistor, such as during discharging of internal capacitances, the controller would be protected. The diode in the circuit can be a flyback diode. If the voltage at the node were to spike up, this diode would discharge it to prevent damage to the transistor. The component that requires the most current is the peristaltic pump at 350 mA. By way of example, an INTERNATIONAL RECTIFIER® IRLML2803 transistor (manufactured and/or sold by International Rectifier Corporation of El Segundo, Calif.) can handle a current of 930 mA at 70° C., which is well-suited for this application.

Figure 13:
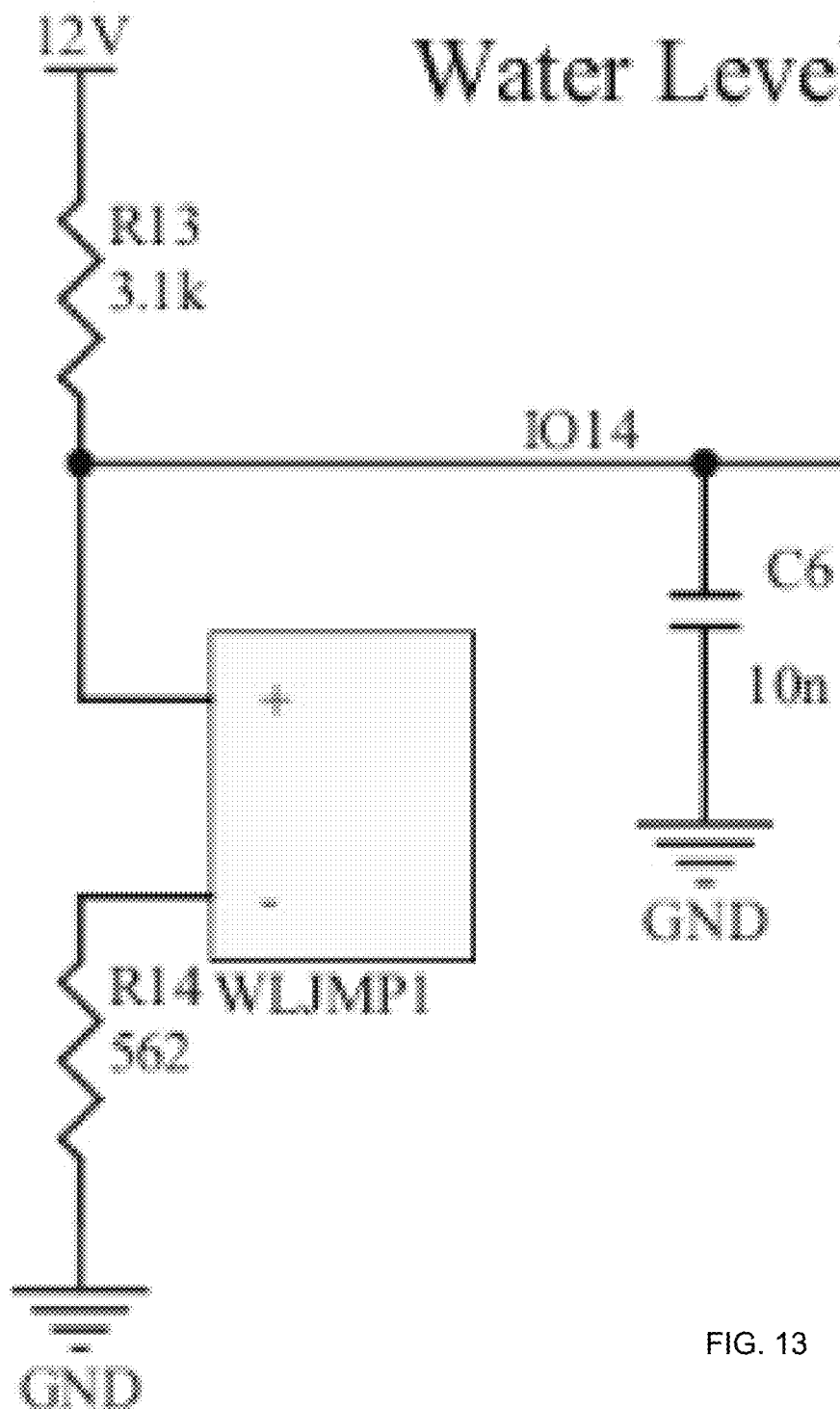
FIG. 13 depicts a solution level sensor according to an embodiment of the invention.

FIG. 13 depicts the circuit for the solution level sensor. The sensor is an 8" continuous liquid level sensor from Milone Technologies of Sewall, N.J. It acts as a variable resistor. The resistance of the sensor was 1.65 kΩ when it was out of fluid, and 380Ω when it was submerged. In between those levels, the variation in resistance is proportional to the level of fluid. The analog pins on an exemplary ARDUINO® breakout board can accept a voltage from 0 V to 5 V but some devices, such as the TI® MSP430 LAUNCHPAD™ baseboard, manufactured and/or sold by Texas Instruments Incorporated of Dallas, Tex., cannot reach zero. In an effort to make the circuit more universal, it was designed to output a voltage between 2.8 V and 5 V. This can be accomplished using a resistor divider. The following equations:

$$\frac{R14 + 1650\Omega}{R13 + R14 + 1650\Omega} = \frac{5\ V}{12\ V} \quad (1)$$

$$\frac{R14 + 380\Omega}{R13 + R14 + 380\Omega} = \frac{2.8\ V}{12\ V} \quad (2)$$

can be solved for R14 and R13 giving 3.1 kΩ for R14 and 562Ω for R13. These are the extrema for the output voltage. An output decoupling capacitor can be included for stability.

Figure 14:
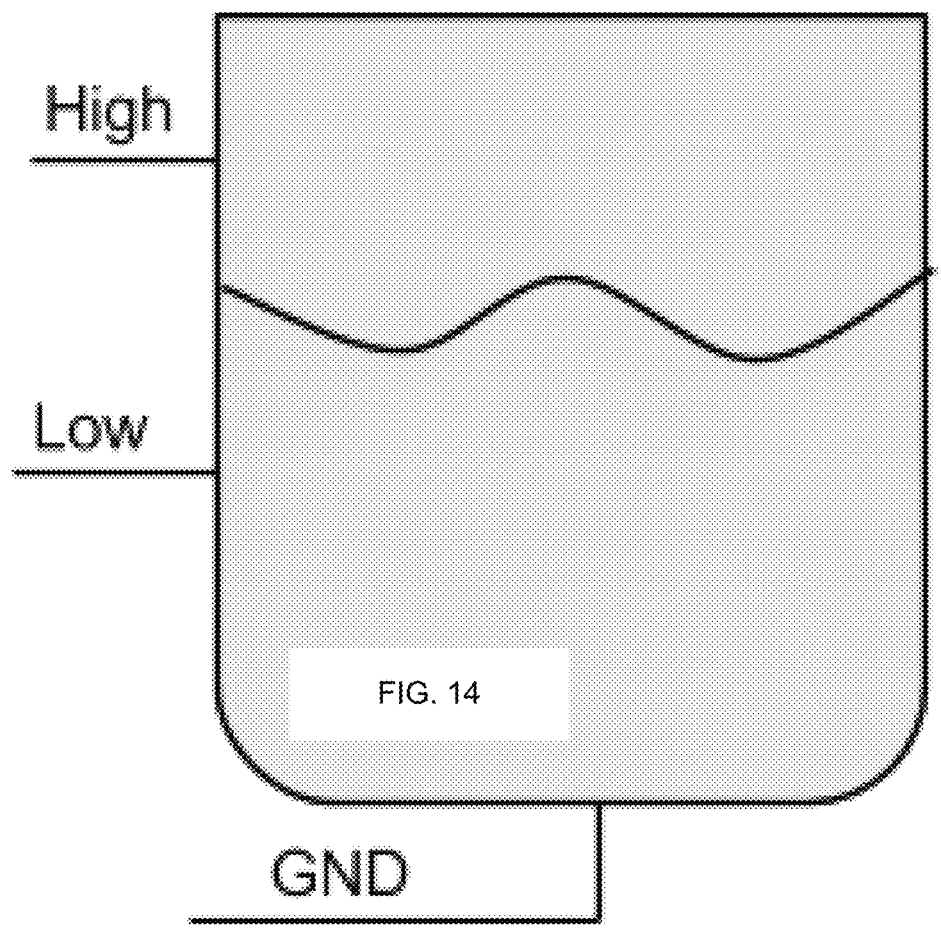
FIG. 14 depicts pin placement within a reservoir for measuring solution level according to an embodiment of the invention.

Nutrient levels can be measured by placing leads into the nutrient reservoirs and allowing the nutrient solutions to complete the circuit. In FIG. 14, the pin labeled G50 would be placed in the nutrient reservoir in the "High" location. If the fluid level is above the lead, it will pull the line to ground thus enabling the PMOS (P-type metal-oxide-semiconductor). This outputs 5 V on the 10 line. If the fluid level is below the lead, the pull-up resistor on G50 will set the line to 5 V and disable the PMOS. The pull down on the 10 pin will then cause an output of 0 V. The nutrient level circuits can also have an enable because applying a voltage to a solution with minerals in it may cause the minerals to either build up on the leads or break apart. The enable can be implemented with a PMOS that is controlled by an output pin on the INTEL® EDISON™ board.

Figure 15:
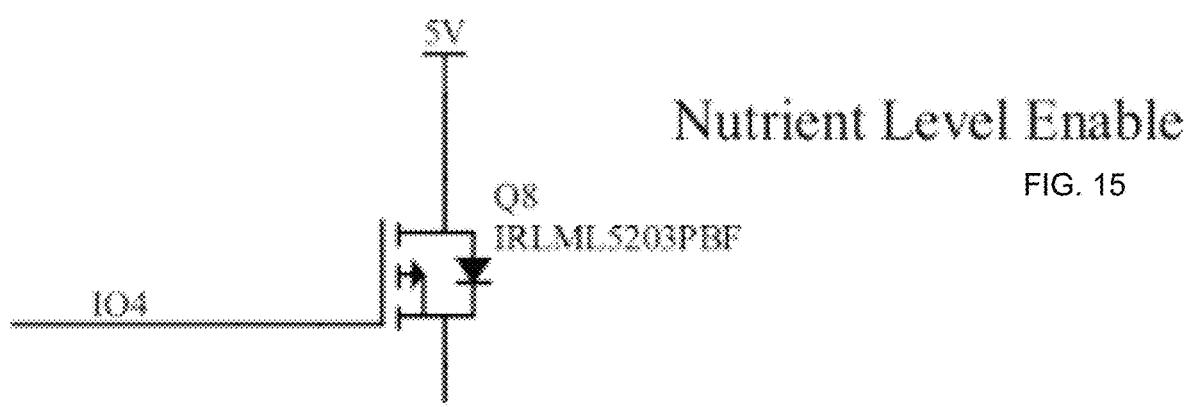
FIG. 15 depicts a nutrient level enable circuit according to an embodiment of the invention.

Electric conductivity (EC) can be measured using the circuits depicted in FIGS. 14 and 15. The EC probe can be similar to the water level sensor in that it is a variable resistor. The solution in which the probe sits in creates some resistance between the leads that is measured. Again, putting an electric current through a solution can cause mineral buildup and breakdown. This can be avoided by using alternating current.

Figure 16A:
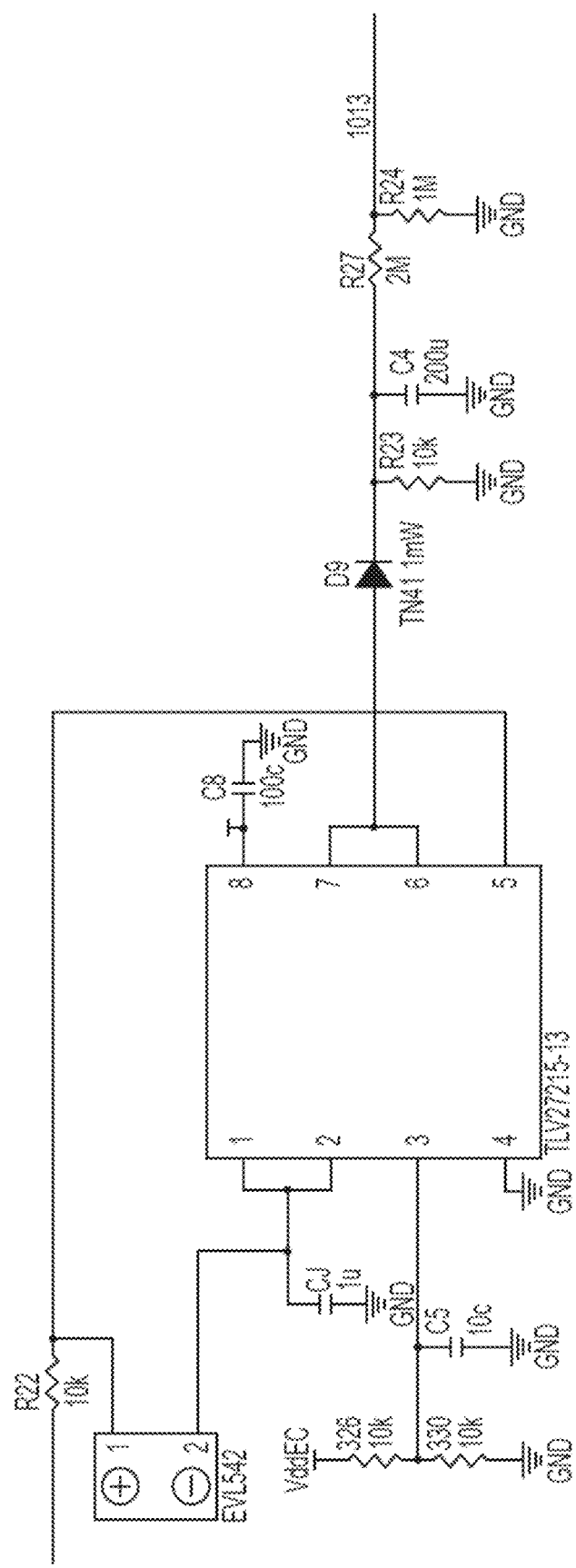
FIGS. 16A and 16B depict a timing circuit using a 555 timer according to an embodiment of the invention.
Figure 16B:
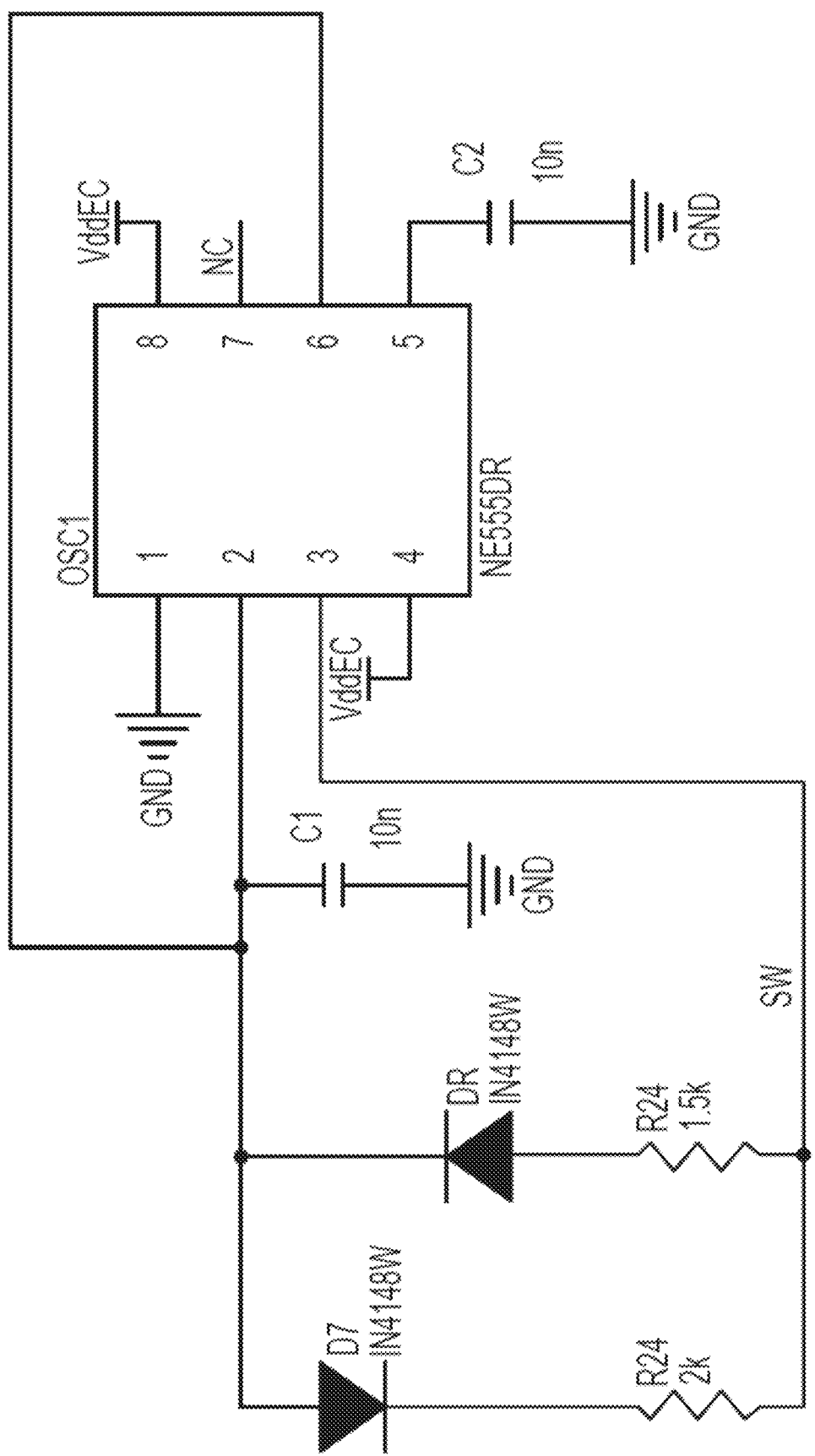

FIGS. 16A and 16B depict a timing circuit using a 555 timer. It outputs a 50% duty cycle 12 V square wave that is fed to the EC probe. The probe has the AC signal on one terminal and a 6 V bias on the other so that the voltage across the terminals of the probe swings between –6 V and 6 V. The resistor divided square pulse is then passed through a half-wave rectifier. This converts AC signal into DC. The signal here has been measured to be between 0 V and 9.5 V, so it is divided evenly by 1 MΩ resistors.

Figure 17:
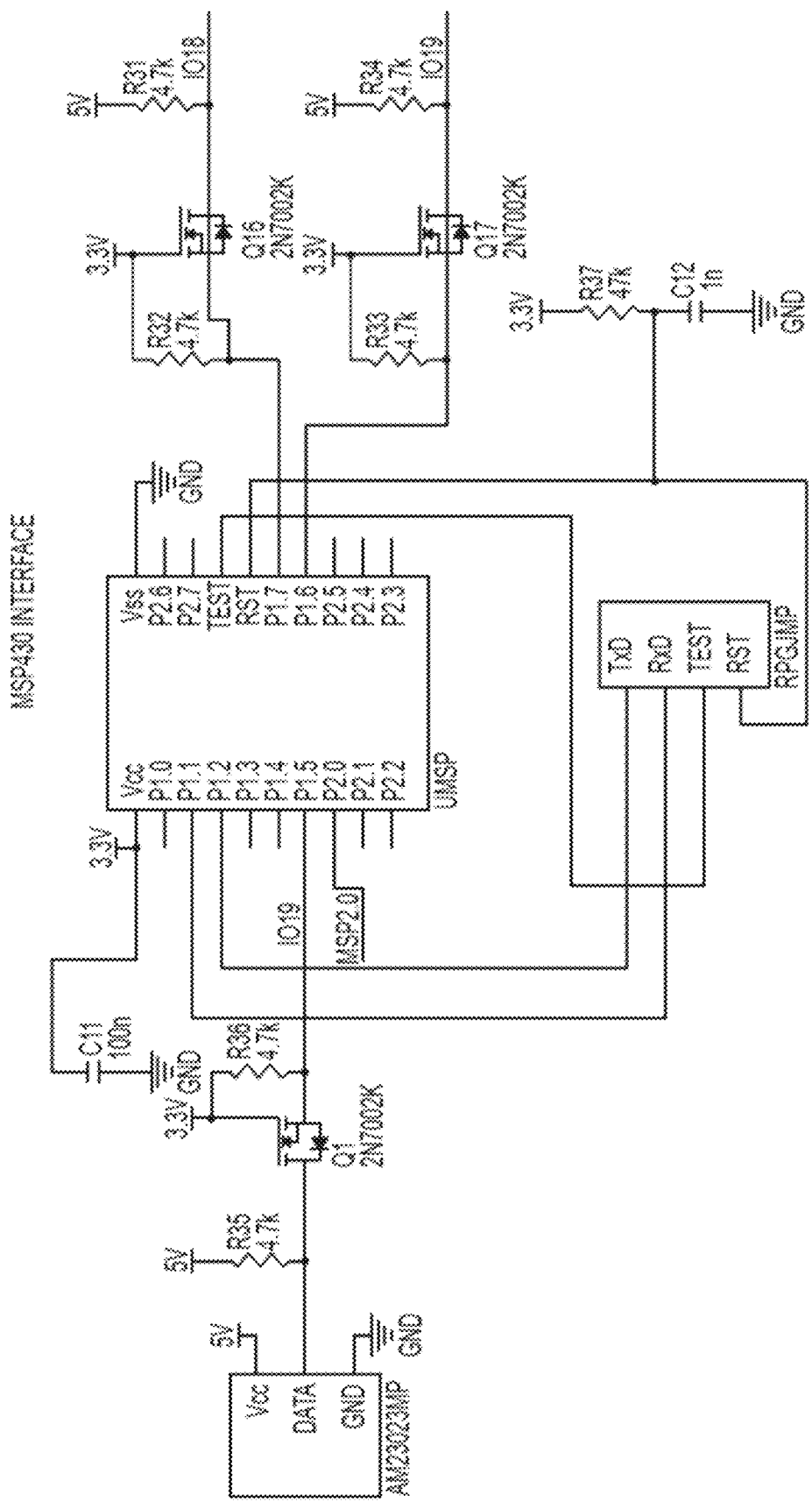
FIG. 17 depicts circuitry for communicating with a temperature and humidity sensor according to an embodiment of the invention.

The PCB can also contain circuitry for communicating with a temperature and humidity sensor shown in FIG. 17. In one example, can be achieved through the use of an TI® MSP430 LAUNCHPAD™ baseboard. The circuit can include an I2C level shifter for communication between the INTEL® EDISON™ board and the TI® MSP430 LAUNCHPAD™ baseboard and a level shifter for communication between the TI® MSP430 LAUNCHPAD™ baseboard and the sensor.

Figure 18:
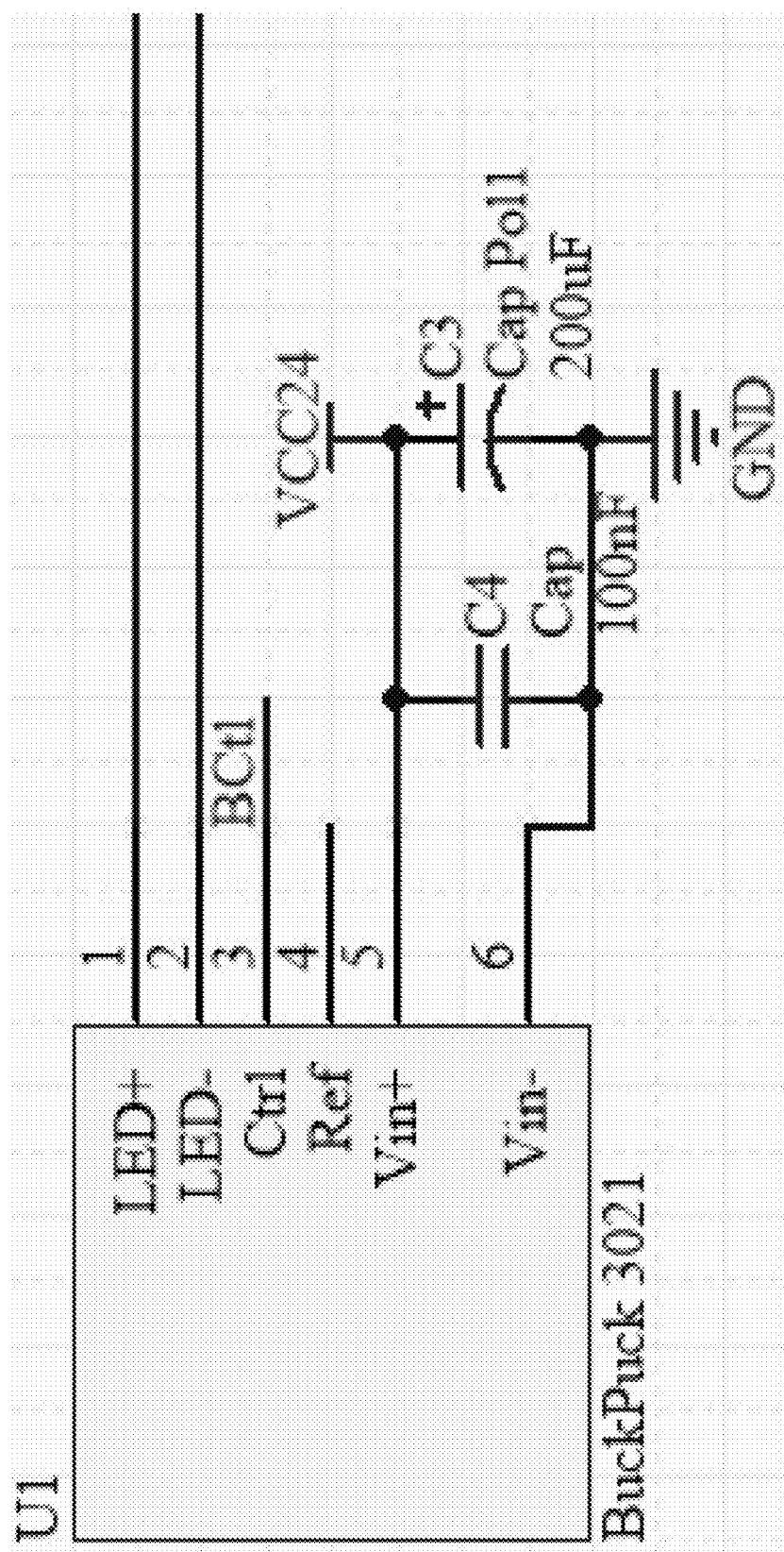
FIG. 18 depicts an example circuit for an LED driver according to an embodiment of the invention.

FIG. 18 depicts an example circuit for an LED driver. The circuit can include a decoupling and bypass capacitor between the terminals of the device to accommodate the long distance needed from the electronics in the lower regions of the grow unit to the LED array located at the top. The LED+ and LED– pins can output a constant current to the LEDs, which is adjustable based on the control voltage to pin 3. The control voltage can be a pulse-width-modulated signal from the INTEL® EDISON™ board whose duty cycle will change based on the desired output current to the LEDs.

Figure 19:
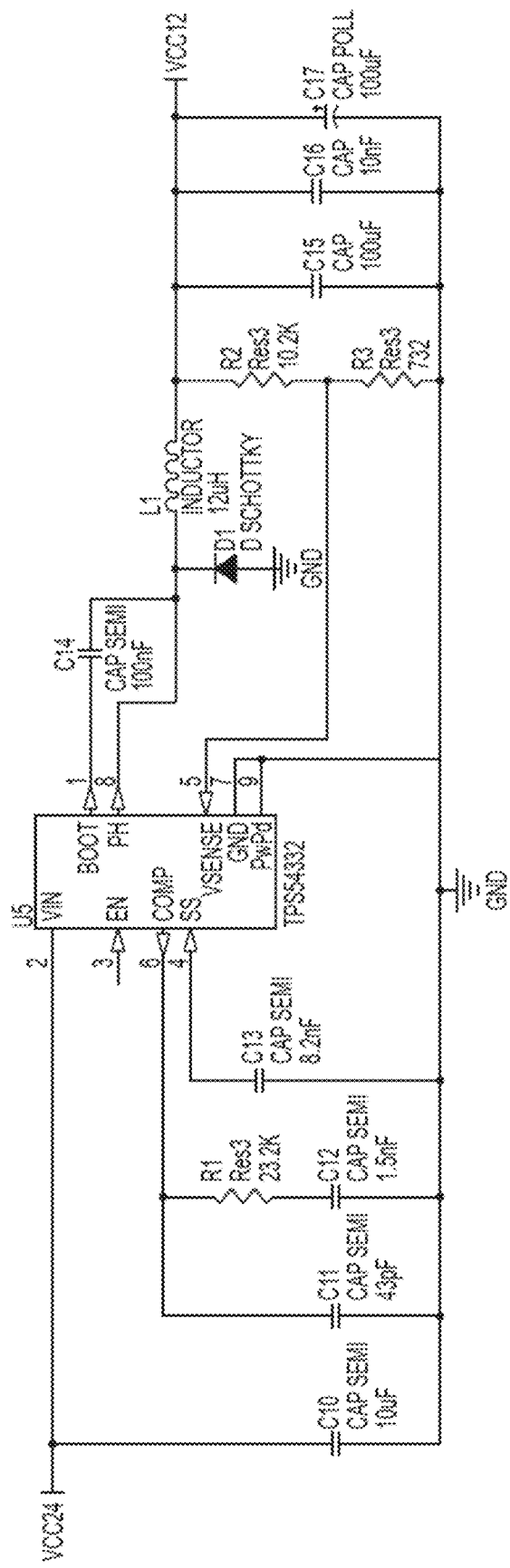
FIG. 19 depicts an example of a buck converter schematic used to convert input voltage of 24 V to the 12 V, 5 V, and 3.3 V that are used to power the multiple devices on the INTEL® EDISON™ board according to an embodiment of the invention.

FIG. 19 depicts an example of a buck converter schematic used to convert input voltage of 24 V to the 12 V, 5 V, and 3.3 V that are used to power the multiple devices on the INTEL® EDISON™ board. The integrated circuit (IC) accepts an input voltage of 24 V and converts it to the desired voltage. The resulting voltage can be selected by changing the values of the resistors that go to the VSENSE pin. The IC also allows selection of the desired frequency compensation components by changing the values of the resistors and capacitors that go to the COMP pin. The rise time can also be chosen by changing the capacitor that is connected to the SS pin. This schematic allows powering the INTEL® EDISON™ board as well as the other 12 V devices such as the fan and pumps.

Networking and Data Flow

Figure 20:
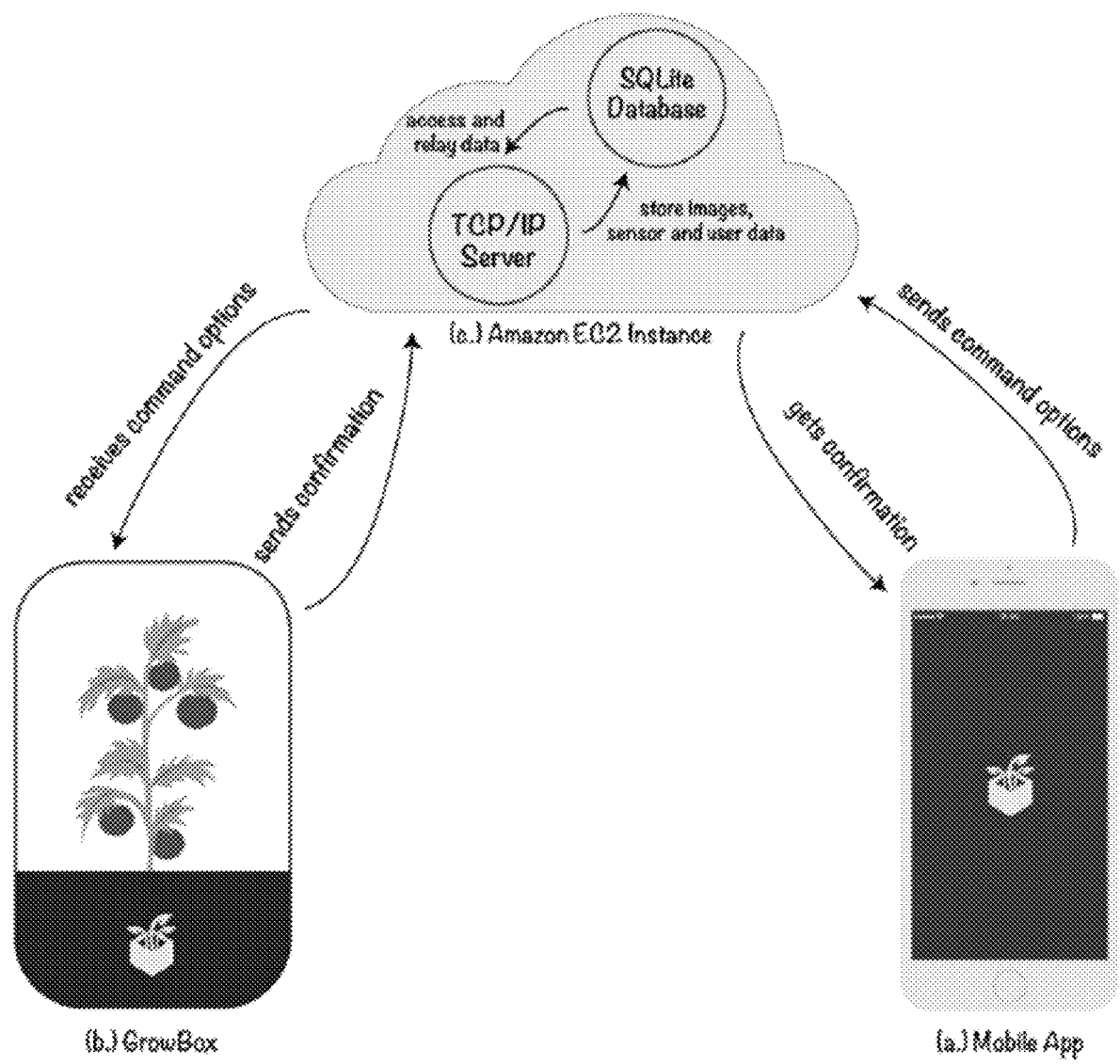
FIGS. 20 and 21 depict a data relay model of how each high level system communicates and interacts with the other components according to an embodiment of the invention.
Figure 21:
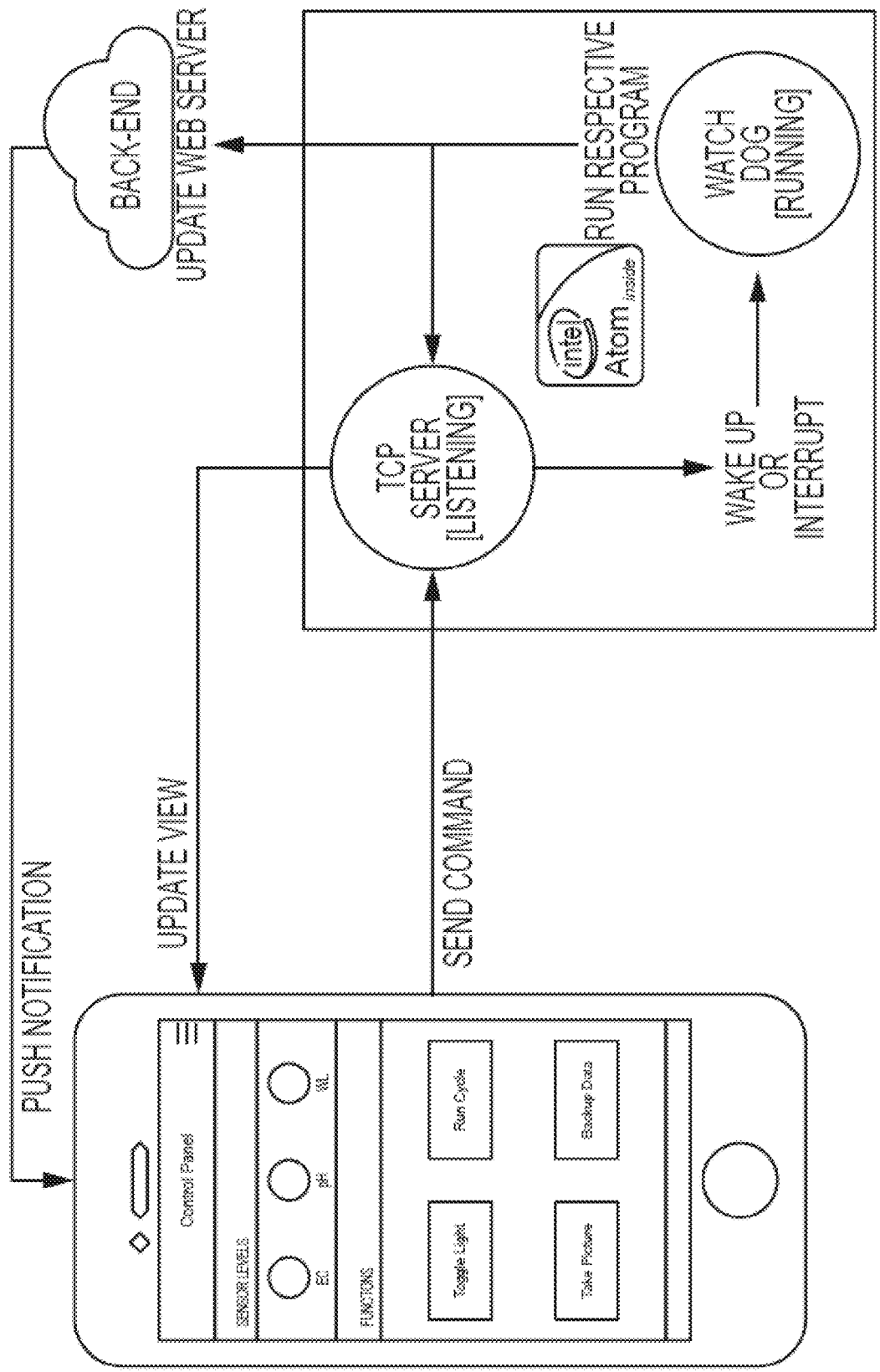

FIGS. 20 and 21 depict a data relay model of how each high level system communicates and interacts with the other components. The grow unit can execute commands that are sent by the mobile application and the grow unit can send back an acknowledgement if the execution was indeed successful along with sensor data if it was requested by the app.

A web service (e.g., an AMAZON EC2®) virtual machine) can act as a reasoner and a "mirror" that receives data from both the app and grow unit and relays it to the targeted device. Each command and acknowledgment can be passed to a multi-threaded socket server that handles the appropriate data relaying. Table 3 provides a list of socket commands and FIG. 21 depicts a method for handling socket commands.

TABLE 3

Socket Commands Table

| Commands | Code | Options | Returns |
| --- | --- | --- | --- |
| Toggle lights on/off | l: | 0/1 | Acknowledgement |
| Change light color | l: | r:b:w (%) | Acknowledgement |
| Toggle water pump on/off | w: | 0/1 | Acknowledgement |
| Remove active profile | k: | nil | Acknowledgement |
| Read water reservoir level | t: | nil | waterLevel = (0/1/2) |
| Read mixing reservoir level | r: | nil | mixingLevel = (xx.xx %) |
| Read nutrient level | n: | nil | micro:grow:bloom = (0/1/2) |
| Read humiture levels | h: | nil | temp:humidity = (xx.xx:xx.xx) |
| Take picture | x: | nil | Acknowledgement |

Additionally, the web service can provide a database directory that stores plant images and SQLITE® tables with plant profile, JSON files, user's plant data, and active profile diagnostics. The embedded system can periodically update the database and profile diagnostics then securely copies the SQLITE® files to the web service's directory. This enables the app to pull the updated data from anywhere in the world.

Figure 23:
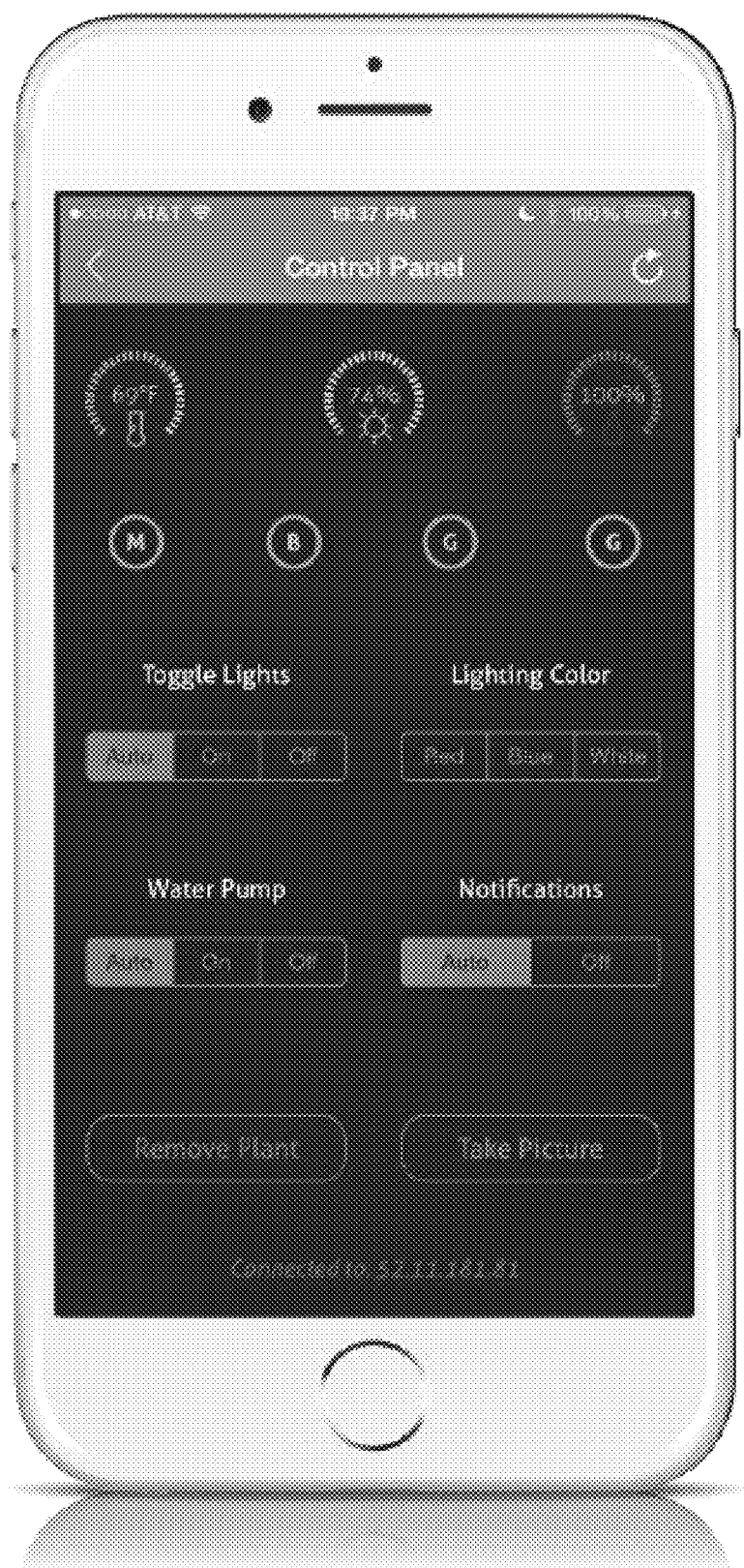
FIG. 23 depicts a screenshot from an exemplary user interface according to an embodiment of the invention.
Figure 24:
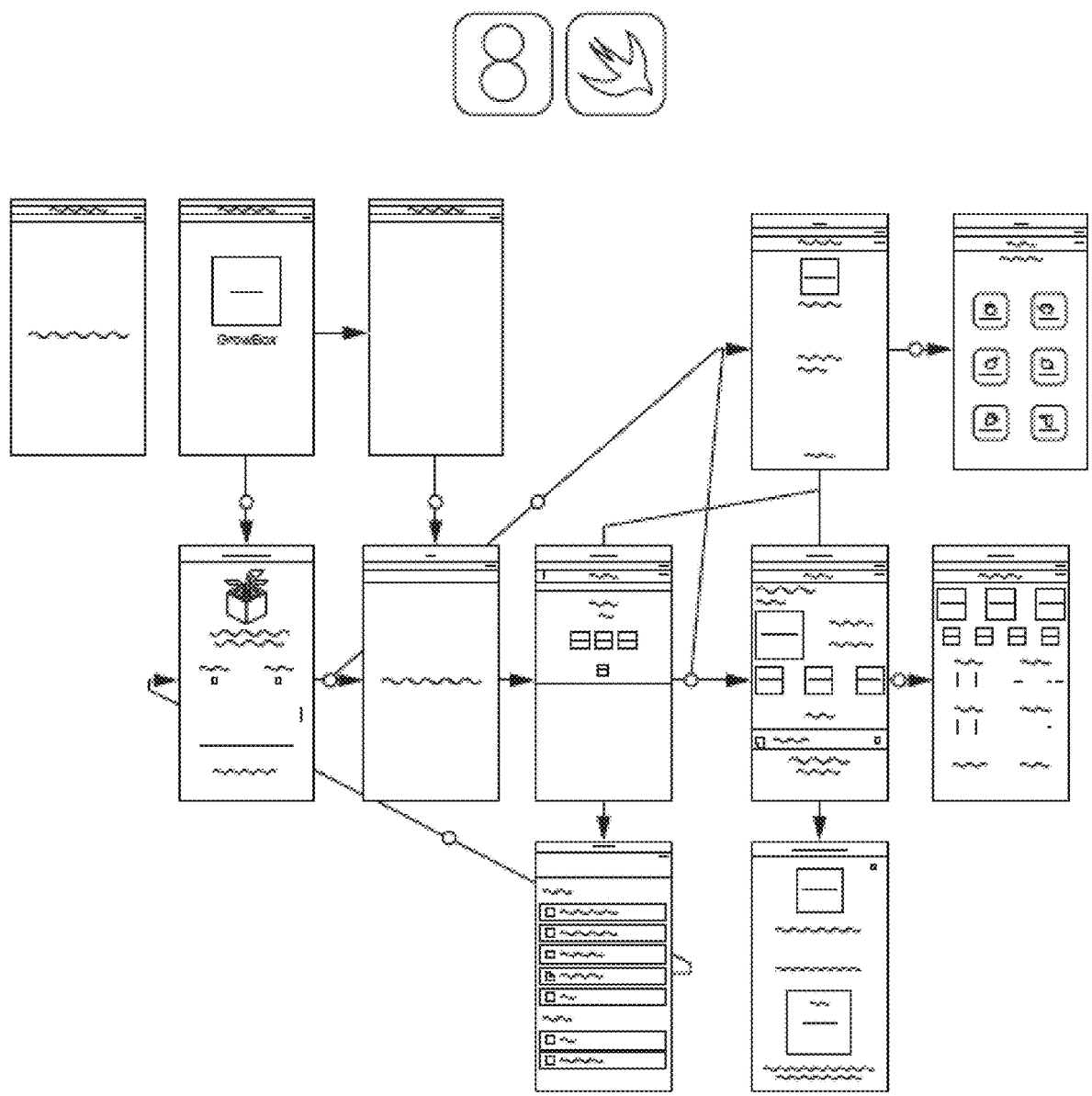
FIG. 24 depicts a main storyboard according to an embodiment of the invention.

In one embodiment, the mobile application is developed using the SWIFT® or OBJECTIVE-C® programming languages available from, Apple Inc. of Cupertino, Calif. FIG. 23 depicts a screenshot from an exemplary user interface and FIG. 24 depicts a main storyboard.

Configuration

Figure 25:
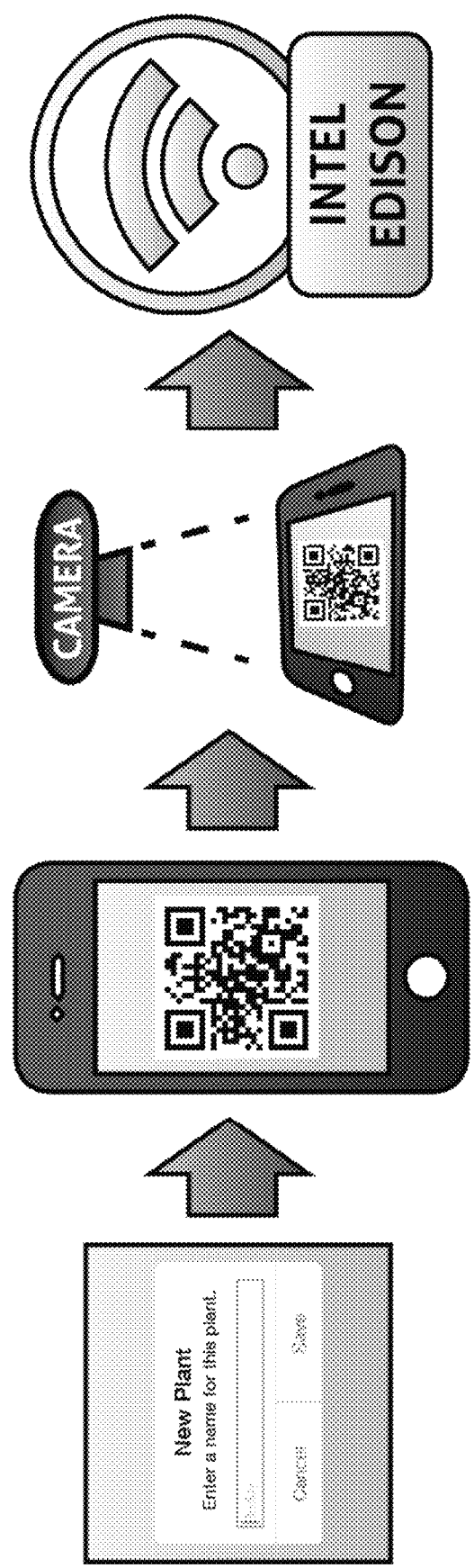
FIG. 25 depicts a QR- or bar-code-based configuration process according to an embodiment of the invention.

Referring now to FIG. 25, one embodiment of the invention provides a QR- or bar-code-based configuration process. A user can enter their WI-FI® credentials into the app to generate a QR code with the required information. The grow unit camera will read this QR code and automatically connect to the WI-FI® network.

This novel process grants the user the ability to connect any number of grow units to their account. Users will be able to manage and control each box individually as well as view the diagnostics and images for each plant.

Figure 26:
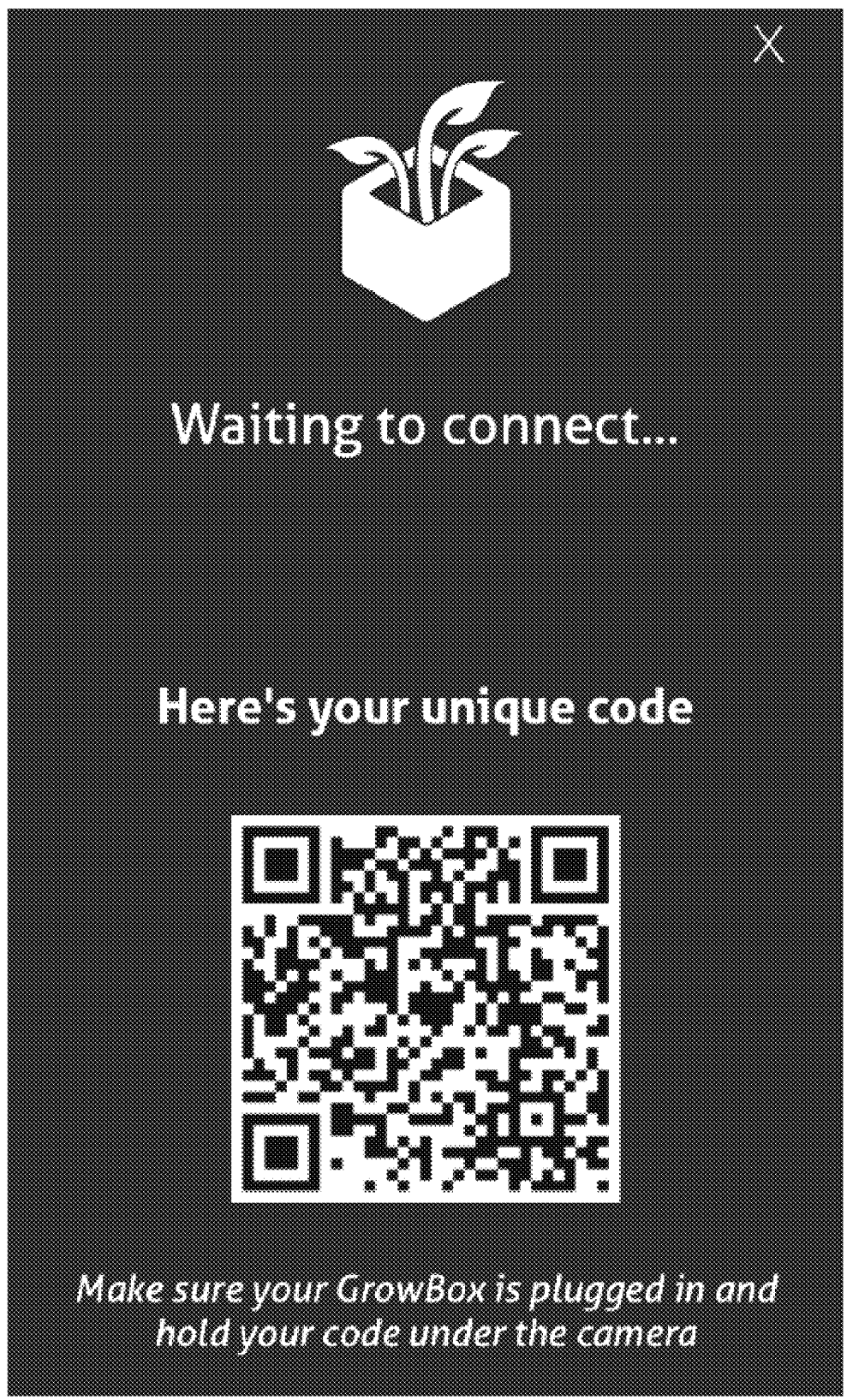
FIG. 26 depicts an exemplary screenshot from a smartphone app according to an embodiment of the invention.

FIG. 26 depicts an exemplary screenshot from a smartphone app according to an embodiment of the invention.

Camera

Camera 110 can be digital camera (also known as a digicam) that encodes digital images. For example, camera 110 can include a charge-coupled device (CCD) or complementary metal oxide semiconductor (CMOS) image sensor. The camera 110 can output a variety of photo file formats such as the Joint Photography Experts Group standard (JPEG), the Tagged Image File Format (TIFF), various Raw image formats, and the like. In some embodiments, the camera 110 is a commercially available camera that includes either a wired or wireless interface such as a USB port for communication with other components of the system.

Predictive Modeling

Figure 38:
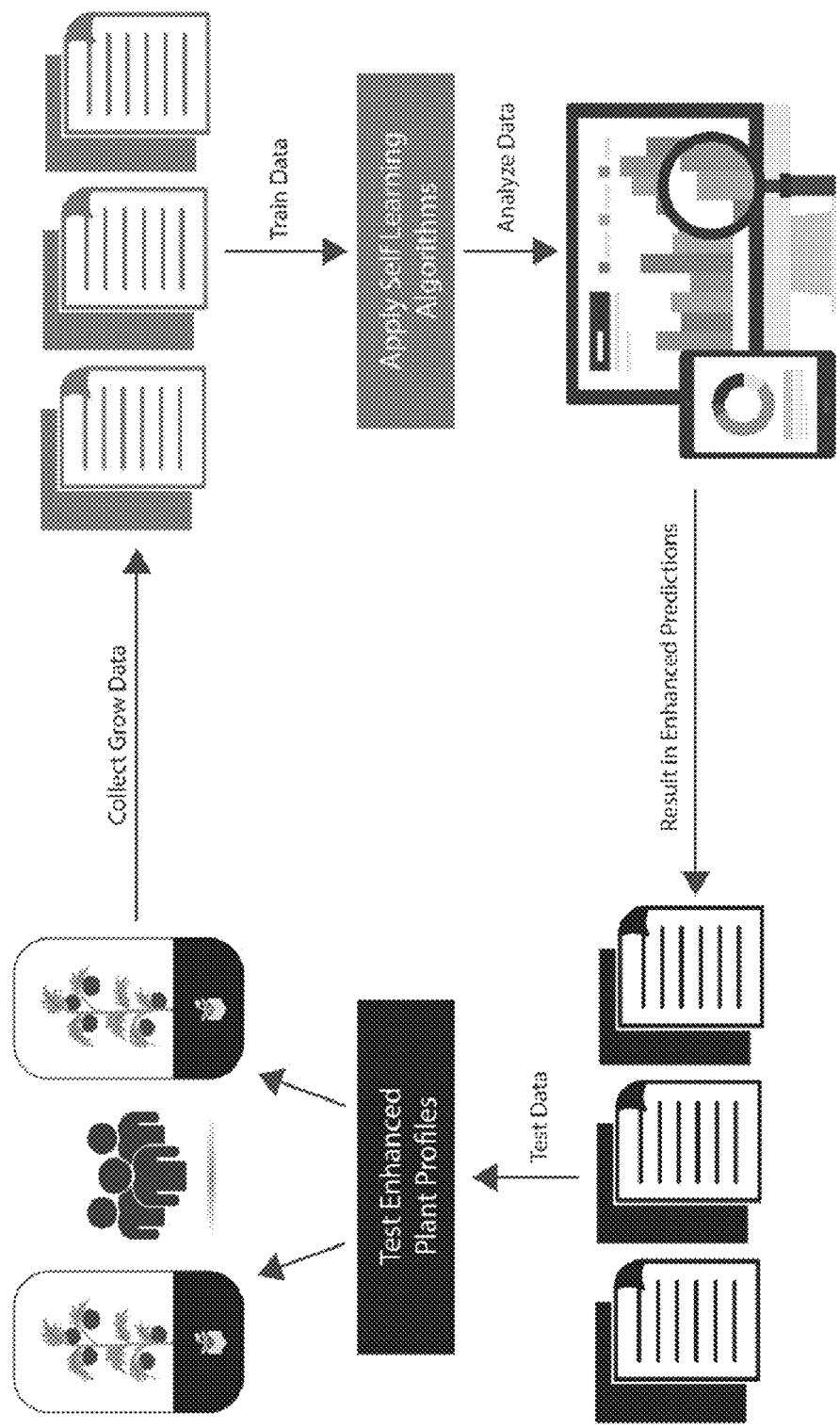
FIG. 38 depicts a feedback loop for generating improved plant profiles based on self-learning algorithms according to an embodiment of the invention.
Figure 39:
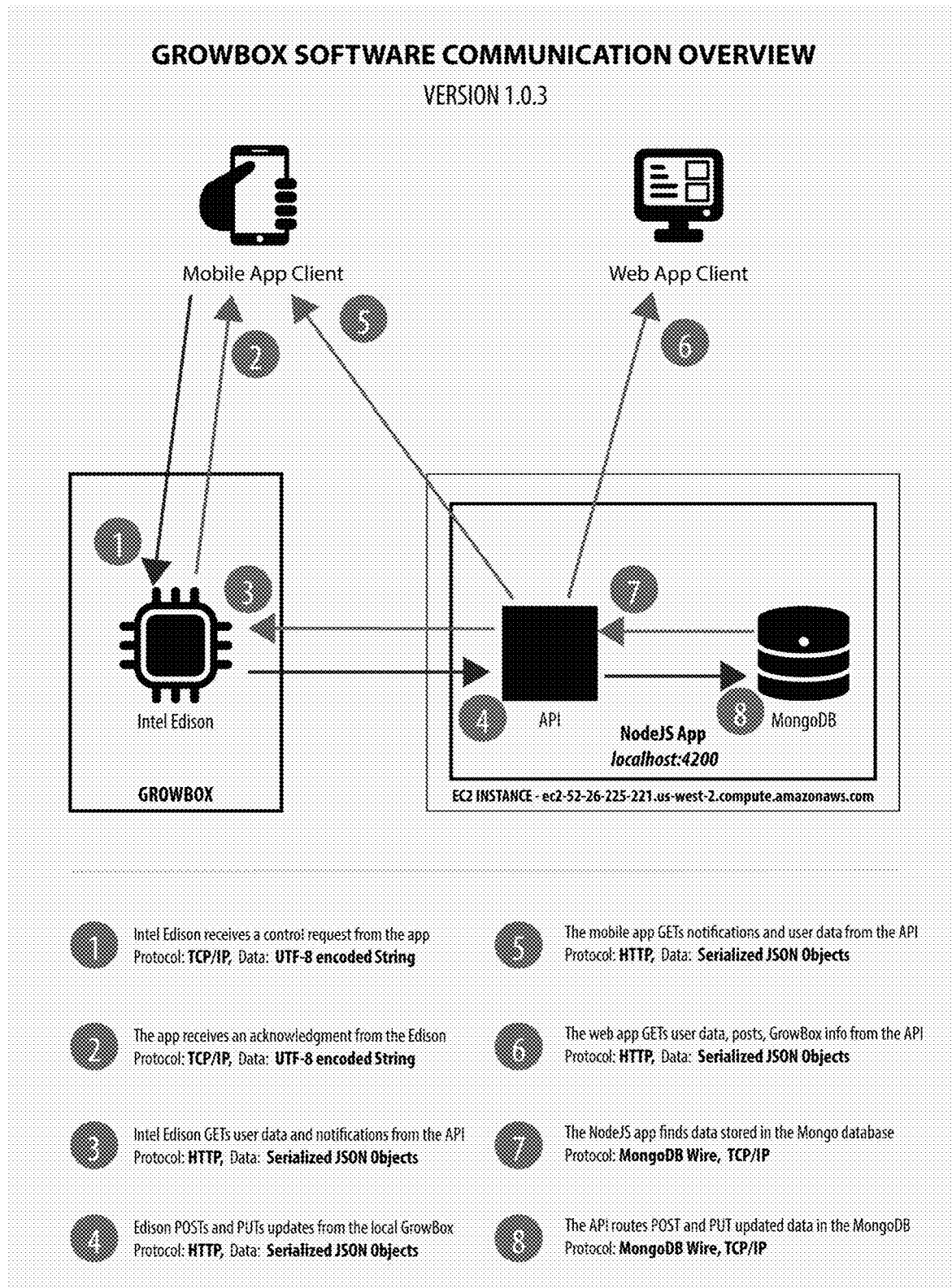
FIG. 39 depicts exemplary data flows between a grow unit, a central server for storing and analyzing data, a mobile app client, and a web app client according to an embodiment of the invention.

Referring now to FIGS. 38 and 39, another embodiment of the invention can utilize artificial intelligence, machine learning, statistical learning, predictive modeling, and the like to optimize plant performance (e.g., in terms of growth rate and/or yield). For example, data regarding growth conditions, environment, growth patterns, health status, yield, and the like. Such data can be automatically collected (e.g., via sensors or other components as discussed herein, from external sources such as Web services providing weather data) or can be manually obtained (e.g., based on user assessment of plant growth, yield, and the like).

A variety of artificial intelligence techniques can be applied. For example, conditions and plant growth results can be entered into a neural network such as a back propagation neural network as described in S. Ghosh & S. Koley, "Machine Learning for Soil Fertility and Plant Nutrient Management using Back Propagation Neural Networks," 2(2) *Int. J. on Recent and Innovation Trends in Computing & Communication* 292-97 (2014).

Application of artificial intelligence techniques can optimize yield, detect and/or prevent disease, detect and/or present nutrient deficiency, and/or reduce energy usage/cost.

WORKING EXAMPLES

Figure 27:
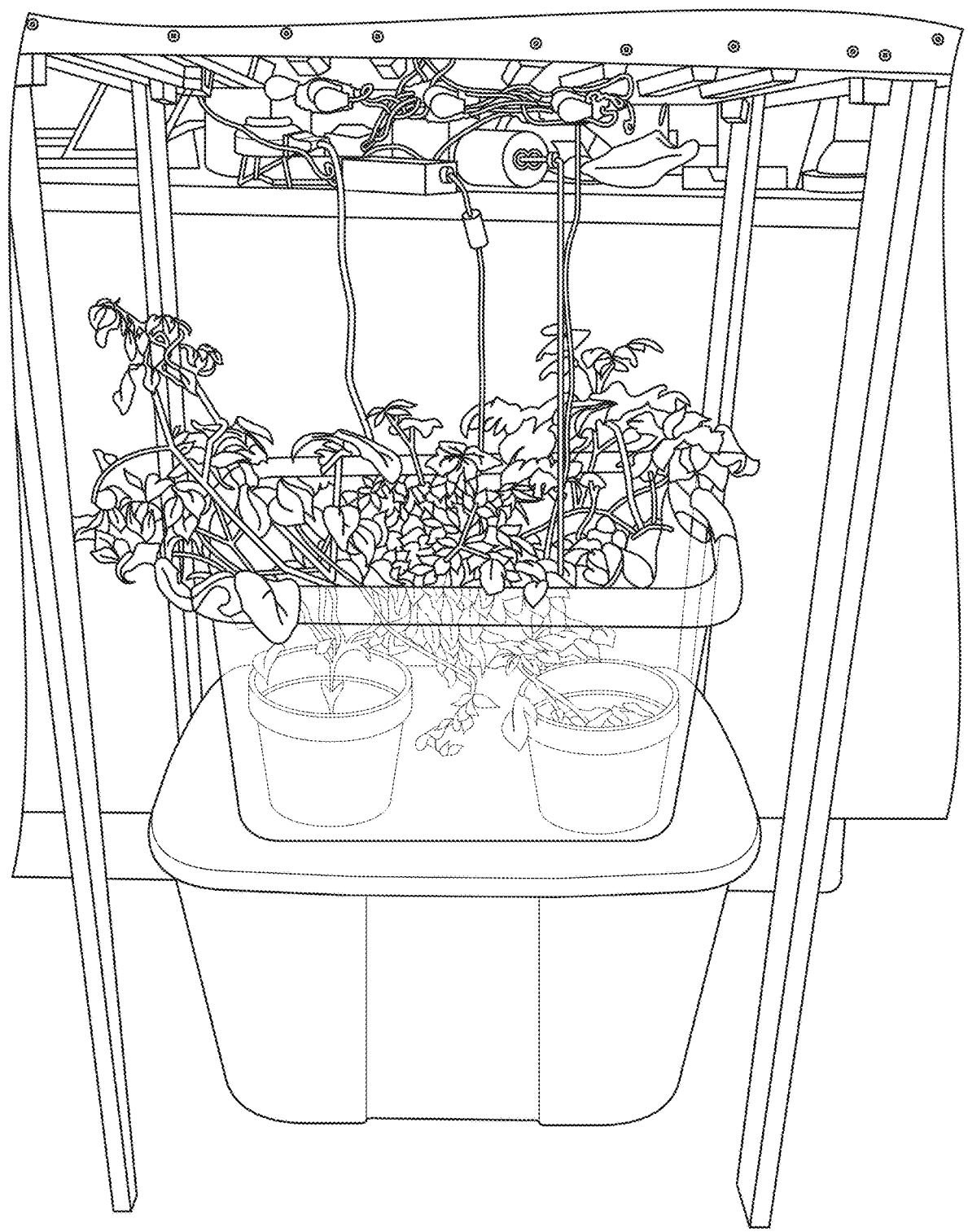
FIGS. 27 and 28 depict two prototypes of embodiments of the invention.
Figure 28:
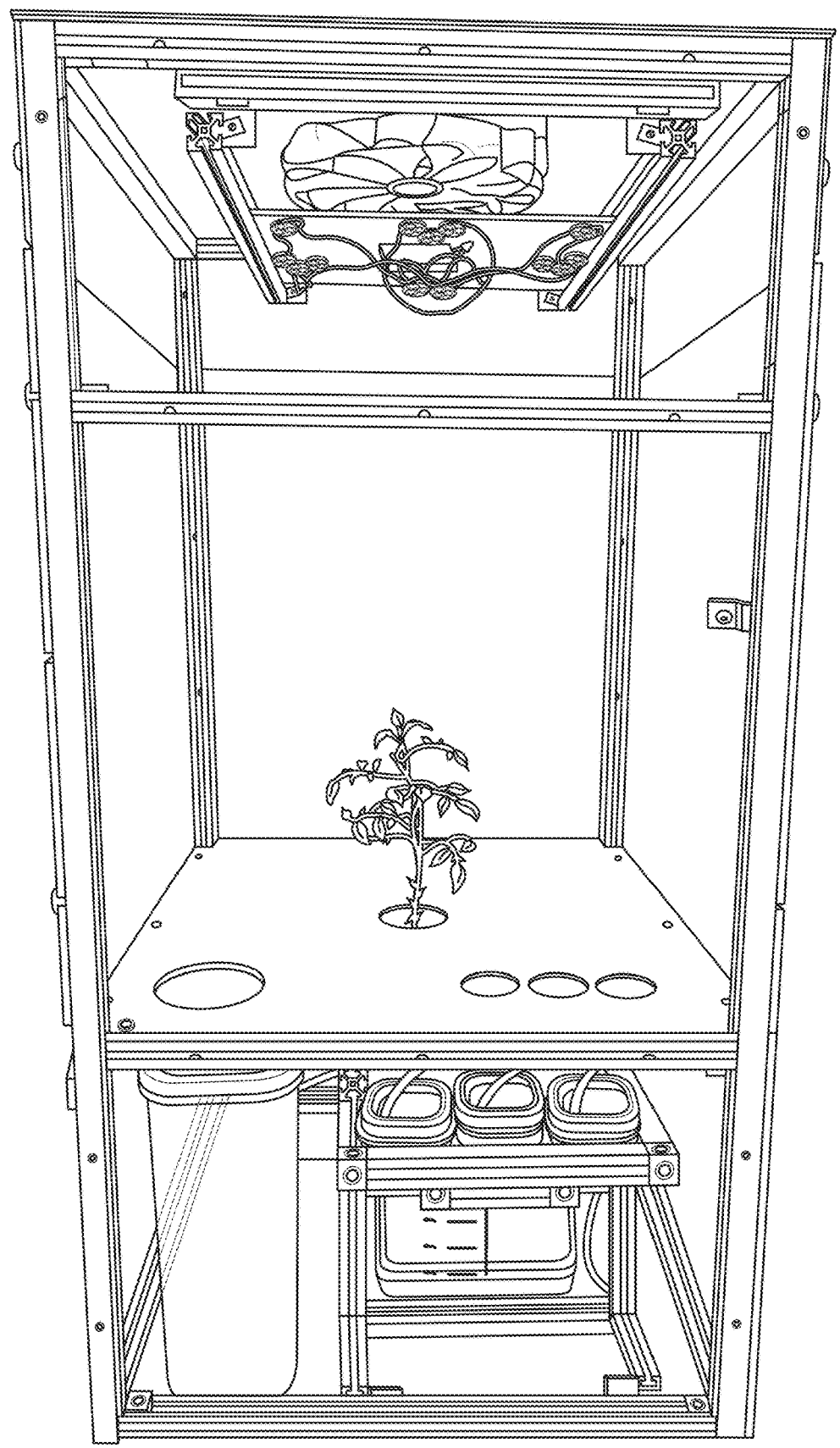

FIGS. 27 and 28 depict two prototypes of embodiments of the invention.

The functions that embodiments of the invention perform can be categorized as environment control, plant diagnosis, network communications, power usage, and user experience. Environment control includes the lighting and nutrition control, plant diagnosis includes capturing images of the plant and processing them, network communications includes sending and receiving data to the cloud, power usage is the actual power input necessary to run the system, and user experience is measured against the simplicity and ease of use of the mobile app. In addition to the physical grow unit 102, the cloud and smartphone application carry out functions of their own.

Environment Control

The performance of the environment control is most effectively measured against the effectiveness of the system to grow plants—the most critical macroscopic functionality of the system. Over the development of the project, there was only sufficient time to fully grow one set of plants in an actual hydroponic system, and for this set of plants the majority of the time was spent in a wooden prototype with somewhat different environmental conditions to the final product. Furthermore, this prototype did not have the lights installed until after the first two stages of life, into what should have been the light-filled vegetative stage. Nonetheless, the plants were able to grow and bear fruit. Table 4 breaks down each stage of life during growth by this prototype.

TABLE 4

| Life Stage | Actual Growth Time | Projected Growth Time | Traditional Growth Time |
| --- | --- | --- | --- |
| Pre-Germination | 7 days | 4-7 days | 4-7 days |
| Post-Germination | 10 days | 4-5 days | 42-56 days |
| Vegetative | 51 days (lights added near end of this cycle) | 25 days | |
| Flowering to Fruiting | 30 days | 25 days | |

The plants did not grow as fast in the system overall as using traditional agricultural methods. However, this was directly correlated to the insufficient light the plants received before the LED controllers were properly configured and a lack of sunlight in the area where the prototype sat. Around implementation of a fully lit system, the plants had the key characteristics of receiving insufficient light in that they grew very tall and not outwards, as the plant tries to grow taller to reach up to a more well-lit area. If there was sufficient light, the plant would instead grow bushier and outwards to the sides more than up tall. The slow growth of these initial stages can be thus be expected to improve for future plants that are provided sufficient light, as indicated in the projected growth time. The later stages match the projected growth because the conditions for the test plants correspond to those described herein. It is difficult to say whether previous growth stunts inhibited these later stages of life as well, despite the improvement of growing conditions. Additionally, the growth and size of the plants very quickly increased once the lights were installed. Based on this notable difference, Applicant expects at least some improvements to the speeds of each stage as a whole.

In terms of the specific systems, there are a few other key things to evaluate the effectiveness of control of the growing environment. The most critical measure is that of the EC or electrical conductivity. The EC measurement is what the system uses in order to determine if more nutrients need to be added to balance the pH of the system and when new nutrients are needed.

Applicant used an EC probe consisting of two wires sitting at a fixed distance in the solution. By measuring the output voltage of the EC circuit, Applicant roughly determined the nutrient concentration. The output voltage for Boston tap water without nutrients was 3.12 V. With the maximum nutrients required, the voltage was 2.45 V. With half the nutrients, the voltage was 2.53 V; with a quarter, it was 2.61 V. This can be with the exponential expression $3.023x^{-0.046}$.

The growth of the plants under the lights described herein proves these specific LED wavelengths are sufficient to grow plants. The performance of the lights can also be measured terms of the actual luminosity within the box.

Power Usage

Tables 5-8 detail the performance of the lights and other components. Embodiments of the invention can be powered from a line power source (also known as mains electricity), e.g., 120 V, 15 Amp service common within the United States. Applicant further measured the box's ability to operate under a low level of power. The selected hardware components were selected to minimize power usage, including the low-power, but high-performance INTEL® EDISON board as well as the energy-efficient and lower-power-consuming LEDs (instead of other more-common lighting solutions such as HID (high-intensity discharge) lamps).

TABLE 5

Power Consumption and LED Performance

| | Driver | | | | LED | | | | | Circuit |
|---|---|---|---|---|---|---|---|---|---|---|
| | $V_{in}$ | I | Ctl | P | | $V_f$ (V) | I (mA) | $V_f$ (V) | P (W) | | Efficiency |
| | (V) | (mA) | (V) | (W) | # | Total | Total | Per | Per | Total | (%) |
| Blue | 24 | 201 | 3 | 4.82 | 4 | 11.6 | 332 | 2.90 | 0.96 | 3.85 | 79.8% |
| Red | 24 | 300 | 2.95 | 7.20 | 8 | 16.8 | 350 | 2.10 | 0.74 | 5.88 | 81.7% |
| White | 24 | 226 | 2.5 | 5.42 | 3 | 8.8 | 485 | 2.93 | 1.42 | 4.27 | 78.7% |

TABLE 6

Power Consumption and LED Performance

| | |
|---|---|
| Current Output (A) | 1.167 |
| Power Output (W) | 14.00 |
| Current Input (A) | 0.727 |
| Power Input (W) | 17.45 |
| Total Efficiency | 80.2% |

TABLE 7

Power Consumption

| Device | $V_{in}$ (V) | Current (mA) | Power (W) | Time On | Percent Time On | Average Current (mA) | Average Power (mW) |
|---|---|---|---|---|---|---|---|
| Peristaltic Pump 1 | 12 | 300 | 3.6 | 2 min per 24 hours | 0.14% | 0.42 | 5.00 |
| Peristaltic Pump 2 | 12 | 300 | 3.6 | 2 min per 24 hours | 0.14% | 0.42 | 5.00 |
| Peristaltic Pump 3 | 12 | 300 | 3.6 | 2 minutes per 24 hours | 0.14% | 0.42 | 5.00 |
| Water Pump (to Reservoir) | 12 | 350 | 4.2 | 10 minutes per 1 week | 0.10% | 0.35 | 4.17 |
| Water Pump (to Plant) | 12 | 350 | 4.2 | 30 minutes per 12 hours | 4.17% | 14.58 | 175.00 |
| INTEL ATOM® EDISON™ board | 12 | 100 | 1.2 | 24 hours per 24 hours | 100% | 100.00 | 1200.00 |
| Fan | 12 | 200 | 1.2 | 24 hours per 24 hours | 100% | 200.00 | 2400.00 |
| EC Circuit | 12 | 10 | 0.12 | 2 minutes per 24 hours | 0.14% | 0.01 | 0.17 |
| Water Sensor | 12 | 2 | 0.024 | 2 minutes per 24 hours | 0.14 | 0.00 | 0.03 |

TABLE 8

Power Consumption

| | |
|---|---|
| Maximum Power (W) | 22.944 |
| Maximum Current (A) | 1.91 |
| Average Current (A) | 0.32 |
| Average Power (W) | 3.79 |
| 12 V Average Current (A) | 0.32 |
| 12 V Average Power (W) | 3.79 |
| 24 V Average Current (A) | 0.55 |
| 24 V Average Power (W) | 13.09 |
| Total Average Current (A) | 0.86 |
| Total Average Power (W) | 16.88 |
| Cost per kW-hour (US$) | 0.16 |
| Cost per Month (US$) | 1.94 |

User Experience

The performance of the user experience is not as easily evaluated, as it is a somewhat subjective matter. The app includes built-in tutorials for the functionality of the individual elements and a clear setup process for initialization with QR codes and connecting the system to a network.

Plant Diagnostics

Another component that makes embodiments of the invention fully autonomous is the plant diagnostics component, implemented via image capture and processing. The image processing can be evaluated against how consistently and correctly it determines the stage of life. This calculation and the resulting actual stage determination can be based on the leaf area segmentation and thresholds for different leaf areas. The color space used makes for very particular segmentation and, because the setting and lighting for the camera is both consistent and controllable (e.g., the camera is able to send messages to the controller if the lights are too bright or too dark), the segmentation is very consistent and performs well.

Figure 29:
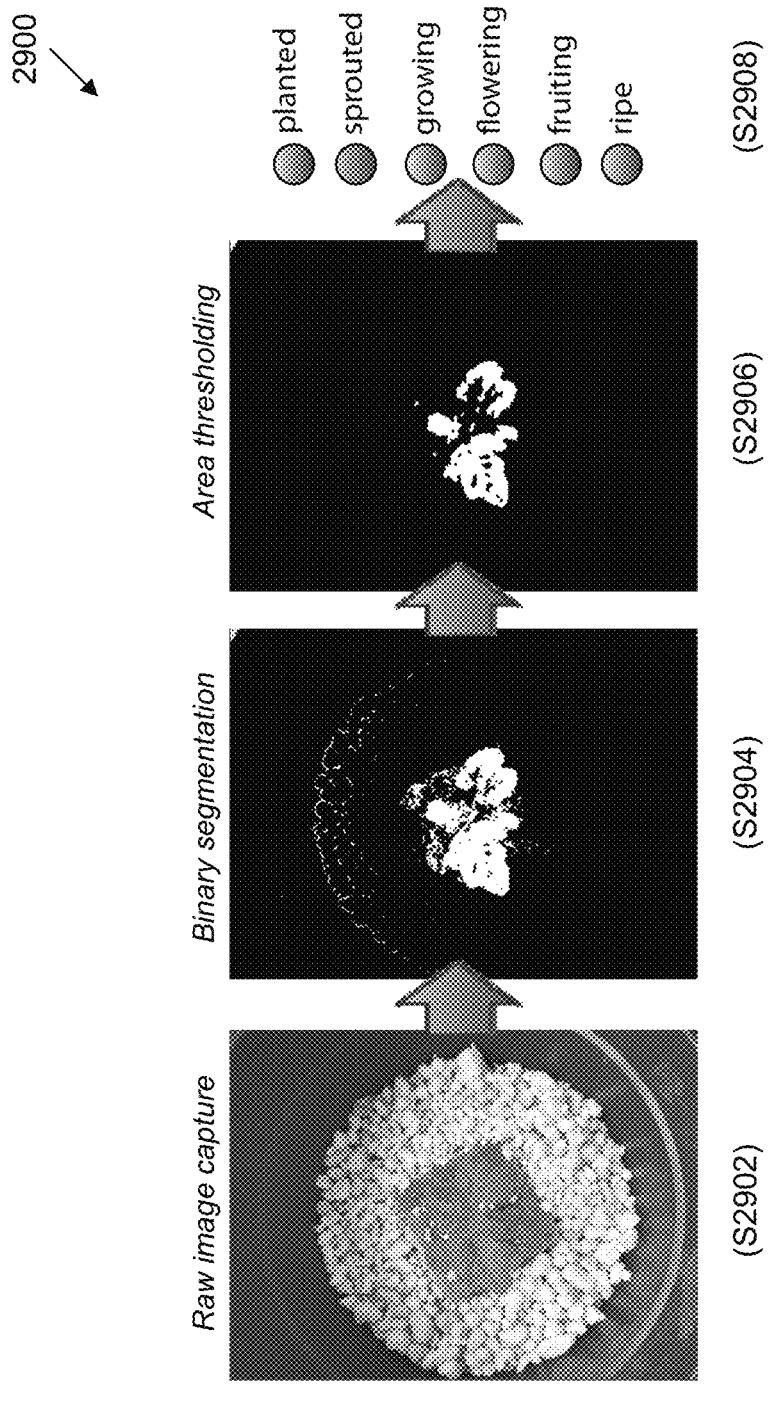
FIG. 29 depicts an algorithm 2900 for plant diagnostics according to an embodiment of the invention.
Figure 29:
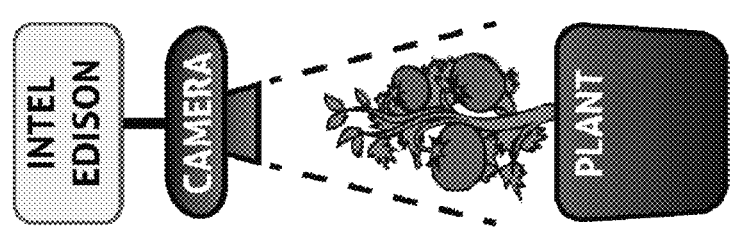

FIG. 29 depicts an algorithm 2900 for plant diagnostics.

In step S2902, a raw image is captured using the camera. The capture of the image can occur in response to a command from a central controller over a wired or a wireless interface. Likewise, the image can be received over a wired or a wireless interface. The image can be can be stored in local memory and/or a storage disk for further processing.

Figure 30:
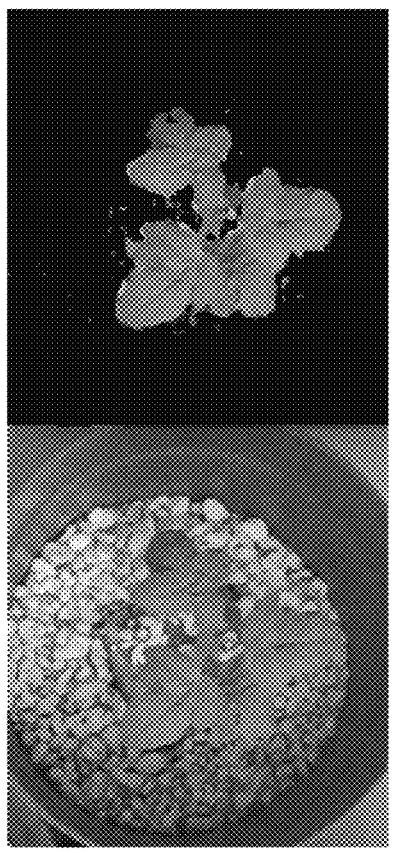
FIG. 30 depicts several examples of segmentation according to embodiments of the invention.
Figure 30:
Figure 30:
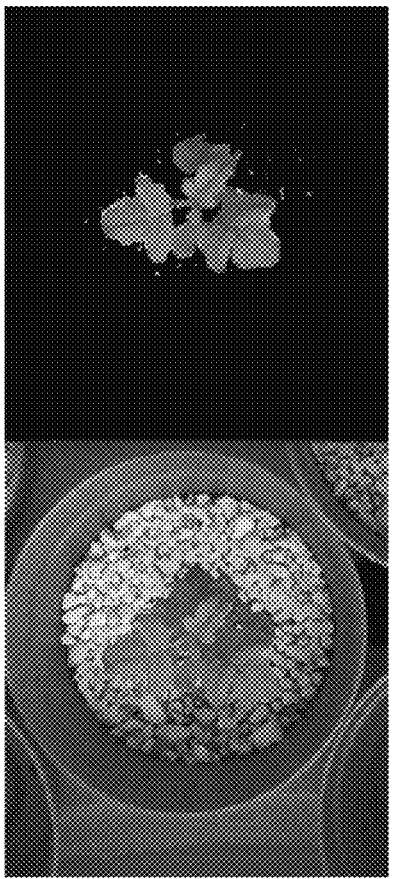
Figure 30:
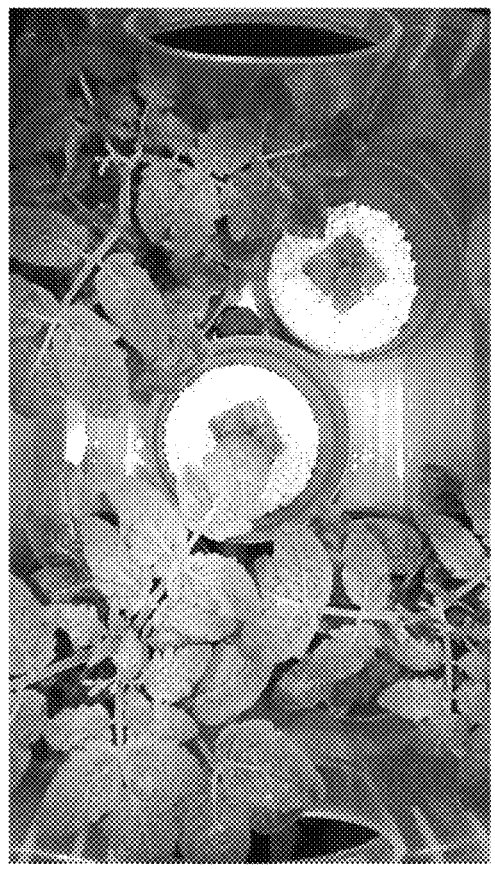

In step S2904, binary segmentation is performed to produce a binary image from a color image. Segmentation is the process of assigning each pixel in the source image to two or more classes. In one embodiment, binary segmentation is performed using Otsu's method as described in N. Otsu, "A Threshold Selection Method from Gray-Level Histograms," 9(1) *IEEE Transactions on Systems, Man, and Cybernetics* 62-66 (1979), which chooses threshold(s) to minimize the intra-class variance of the black and white pixels. In another embodiment, binary segmentation is performed using a watershed method. Binary segmentation can be performed using the imsegfmm function in MATLAB® software available from The MathWorks, Inc. of Natick, Mass. FIG. 30 depicts several examples of segmentation according to embodiments of the invention.

Binary segmentation can be performed on the controller either by loading software including one or more segmentation algorithms or using programmed hardware such as an application-specific integrated circuit (ASIC).

In step S2906, thresholding is performed to classify the binary image as one of several stages of plant life (e.g., planted, sprouted, growing, flowering, fruiting, and ripe). Thresholding functions are provided in MATLAB® software, IMAGEJ™ software available from the National Institutes of Health of Bethesda, Md., and the OpenCV library (e.g., in the cv2.threshold and cv2.adaptiveThreshold functions). Thresholding algorithms are described in J. Kapur et al., "A new method for gray-level picture thresholding using the entropy of the histogram," 29 *Comput. Vis. Graph. Image Process.* 273-85 (1985) and J. Kittler & J. Illingworth, "Minimum error thresholding," 19 *Pattern Recogn.* 41-47 (1986).

In one embodiment, a PYTHON® program receives processed image data as input and compares the plant's attributes (e.g., height, leaf area, and color) to pre-defined dictionary values and returns the plant's stage of life (e.g., as a string data structure). (Height can be measured manually, e.g., with a ruler, measuring tape, or by user estimate, or can be measured using a second camera mounted horizontally.

For example, if a tomato plant has 4 leaves and has a total leaf area of 6 in$^2$, the application logic will compare values and correlate a leaf count ranging from 2-4 leaves and a leaf area between 4-6 in$^2$ with a "vegetative" plant stage.

Thresholding can be performed on the controller either by loading software including one or more segmentation algorithms or using programmed hardware such as an application-specific integrated circuit (ASIC).

Figure 31:
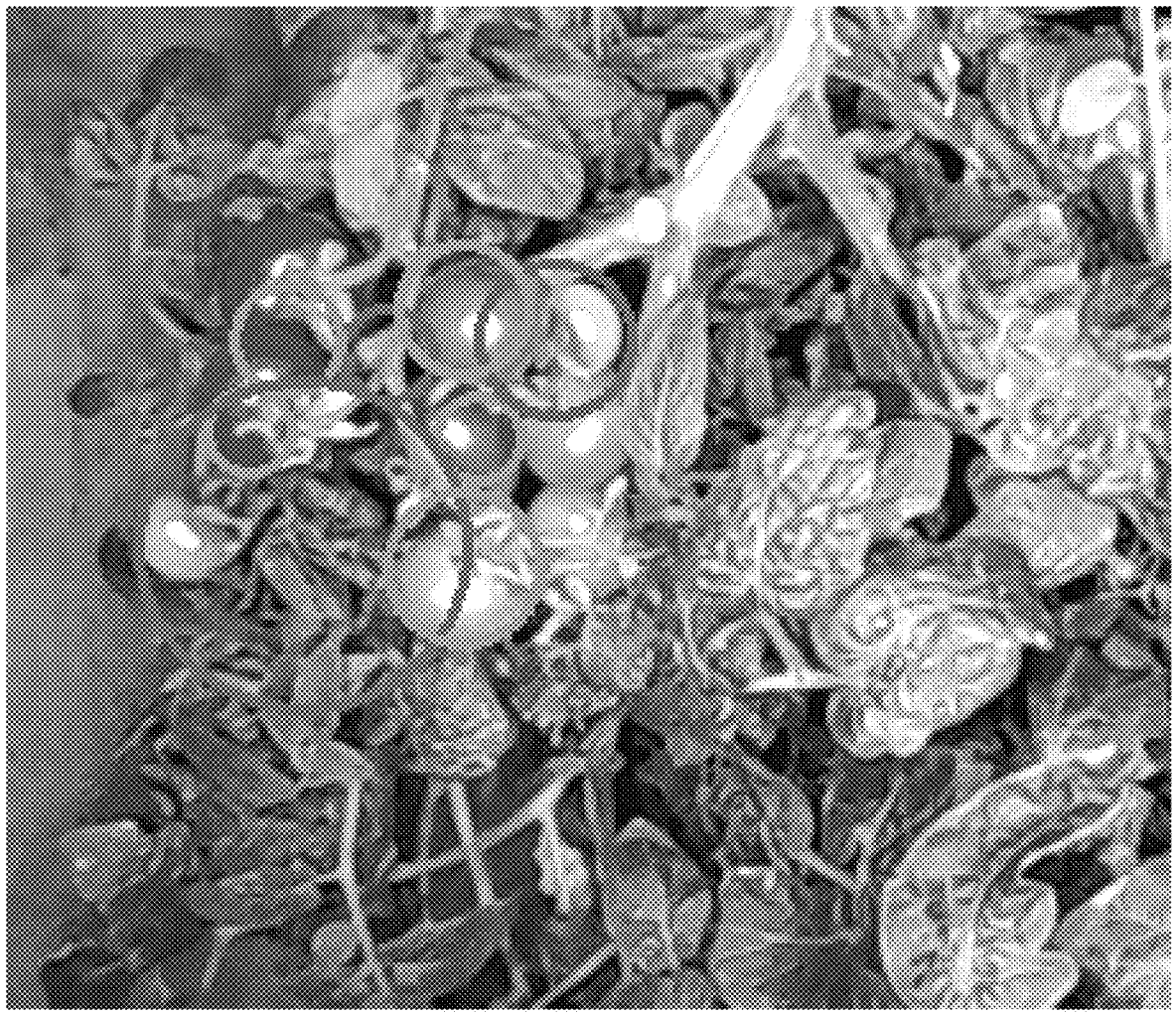
FIG. 31 depicts location of fruit detection according to an embodiment of the invention.

Fruit segmentation and counting is functional. While the system requirements only indicate the need to know when fruit are appearing to know to pick, the description of number of estimated fruit is also a very useful one. FIG. 31 depicts location of fruit detection according to an embodiment of the invention. Green circles are determined to be real fruit, blue circles are possible matches filtered out by the algorithm.

The classification system can be utilized to control operation of one or more components of the system as discussed herein such as lights and water and/or nutrient pumps.

Plant profiles can be generated a priori for one or more plants. The profile can provide a recipe for growing a particular plant and specify conditions such as light cycle, feed cycles, temp, humidity, and the like. The profiles can be written in JSON format, which can be read by the app and controller and stored in a MONGO® database. A sample plant profile is provided in Appendix A.

Applicant performed tests using images captured from different growth points of a plant in the prototype box and performing image processing on these images. The green of the leaves was segmented out to determine the overall size of the plant. The number of ripening fruit was then counted. This test also shows the functionality of the module as a part of the larger internal scheduling system and a series of socket connections with the main controller program.

This functionality allows the system to be headless and not require the user to know details about the growth of the plant. The image processing defines the stage of life of the plant so that the rest of the system can adjust its response and cycles accordingly. The test was performed on a laptop so that the results could be seen in real time. The code has however been implemented on INTEL® EDISON™ boards, with runtimes on the order of 5-10 minutes versus 20 seconds on a full-scale operating system.

Procedure

First, the python imgProc.py -p -v -ui -file f0.jpg function was executed. The -p option is for process image, -v and -ui options are for verbose and ui output, and the -file option specifies the input file. Instead of including the -file option, the -take option can be used to automatically capture an image and process the capture image instead in the INTEL® EDISON™ environment.

Next, the outputs were viewed to verify the percentage of correctly segmented leaf area and, if relevant, the number of correctly and incorrectly identified fruits.

These steps were repeated for the images f1.jpg, f2.jpg, and f3.jpg.

Interfacing of the system with the controller was tested by first running python testServer.py.

The image processing module was launched in server listening mode with python imgProc.py -server -v.

The profile name of the plant was sent from the server side. A ping was sent from the server. The command take p was sent to simulate taking and processing an image. The command kill was sent to show killing the image processing client.

Results

For image segmentation, the process was carried out on four different test images to check the area of green leaves and provides an estimate for the stage of life estimate.

Figure 32:
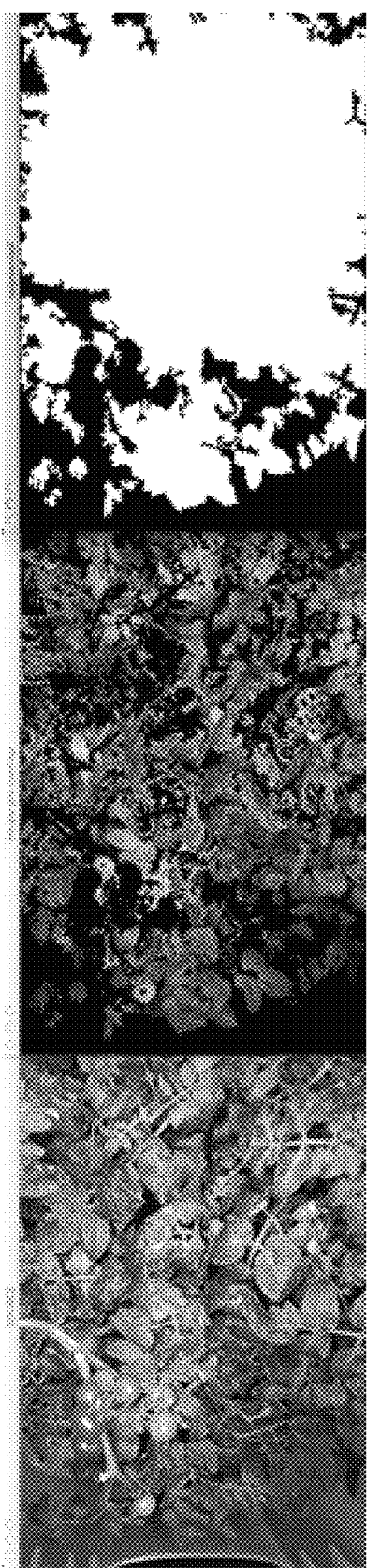
FIGS. 32-34 depict tests of segmentation and classification algorithms according to embodiments of the invention.

In FIG. 32, the leaf area is calculated as 197,446.0 square pixels and the plant is correctly categorized as stage 4 (fruiting).

Figure 33:
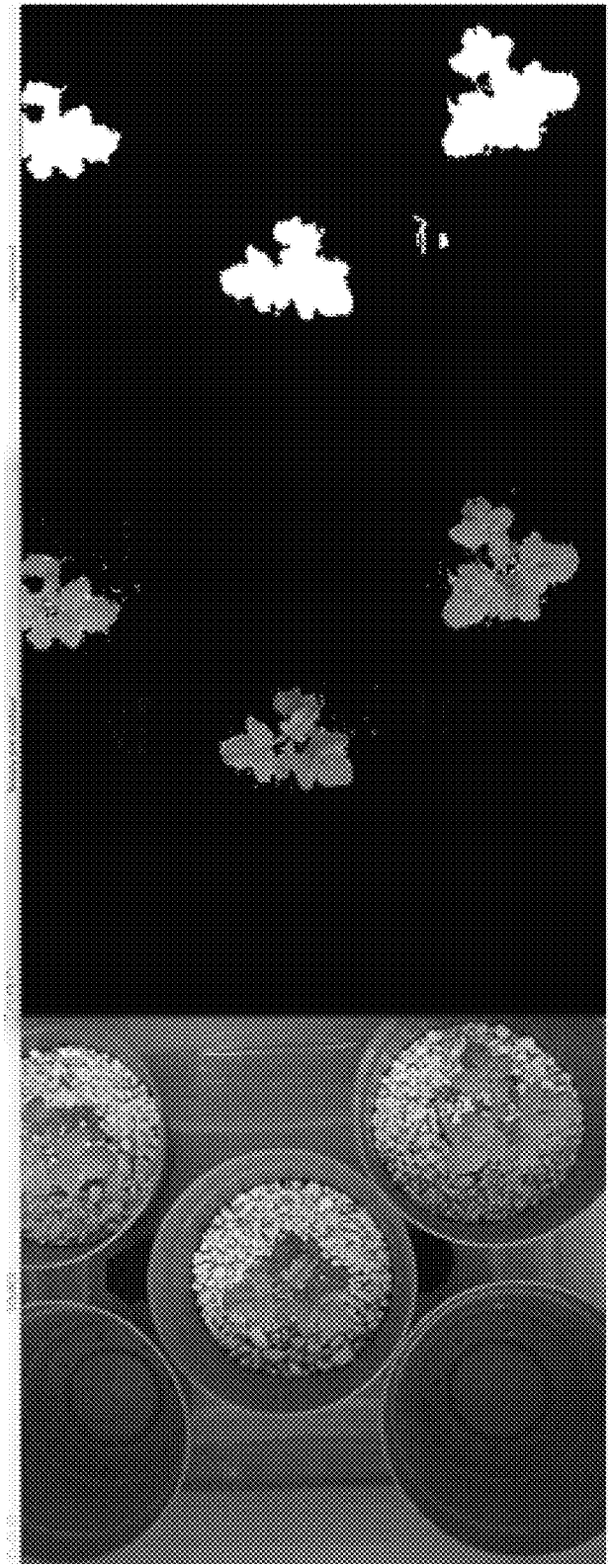

In FIG. 33, the leaf area is calculated as 34,649.0 square pixels. (A higher resolution source was used, but the number of pixels was normalized for comparison to FIG. 32.) The plant is correctly categorized as stage 2 (vegetative).

Figure 34:
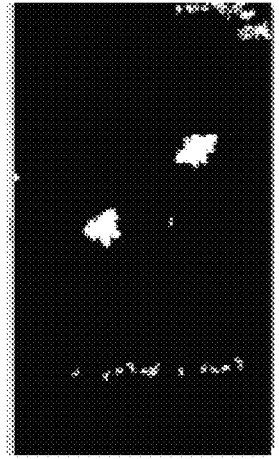
Figure 34:
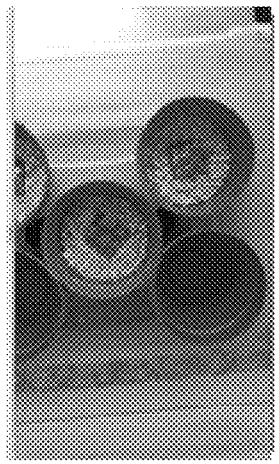

In FIG. 34, the leaf area is calculated as 18,986.5 square pixels. Some segmentation errors can be seen on the left and right regions of images. Nevertheless, the plant is correctly categorized as stage 1 (sprouted).

In FIG. 35, the plant is correctly categorized as stage 4 (fruiting). Additionally, 6 of 6 ripened or ripening fruits were detected (as depicted by green circles in the right panel). 1 false positive and 1 false negative were detected. The red flower pot that triggered the false positive can be excluded from a commercial embodiment in favor of containers and/or backgrounds that have dissimilar colors from fruits.

In FIG. 36, the plant is correctly categorized as stage 4 (fruiting). Additionally, 6 of 7 ripened or ripening fruits were detected (as depicted by green circles in the right panel). 1 false positive and 0 false negatives were detected.

Both segmentation and fruit detection work fairly well given the test environment. The fruit detection is within original specification and the processing time is well within required time. Processing requires about 3-8 seconds on a desktop computer depending on whether fruits are detected. Processing requires between 8 and 12 minutes on the INTEL® EDISON™ board compared to the half hour specified maximum processing time.

Figure 37:
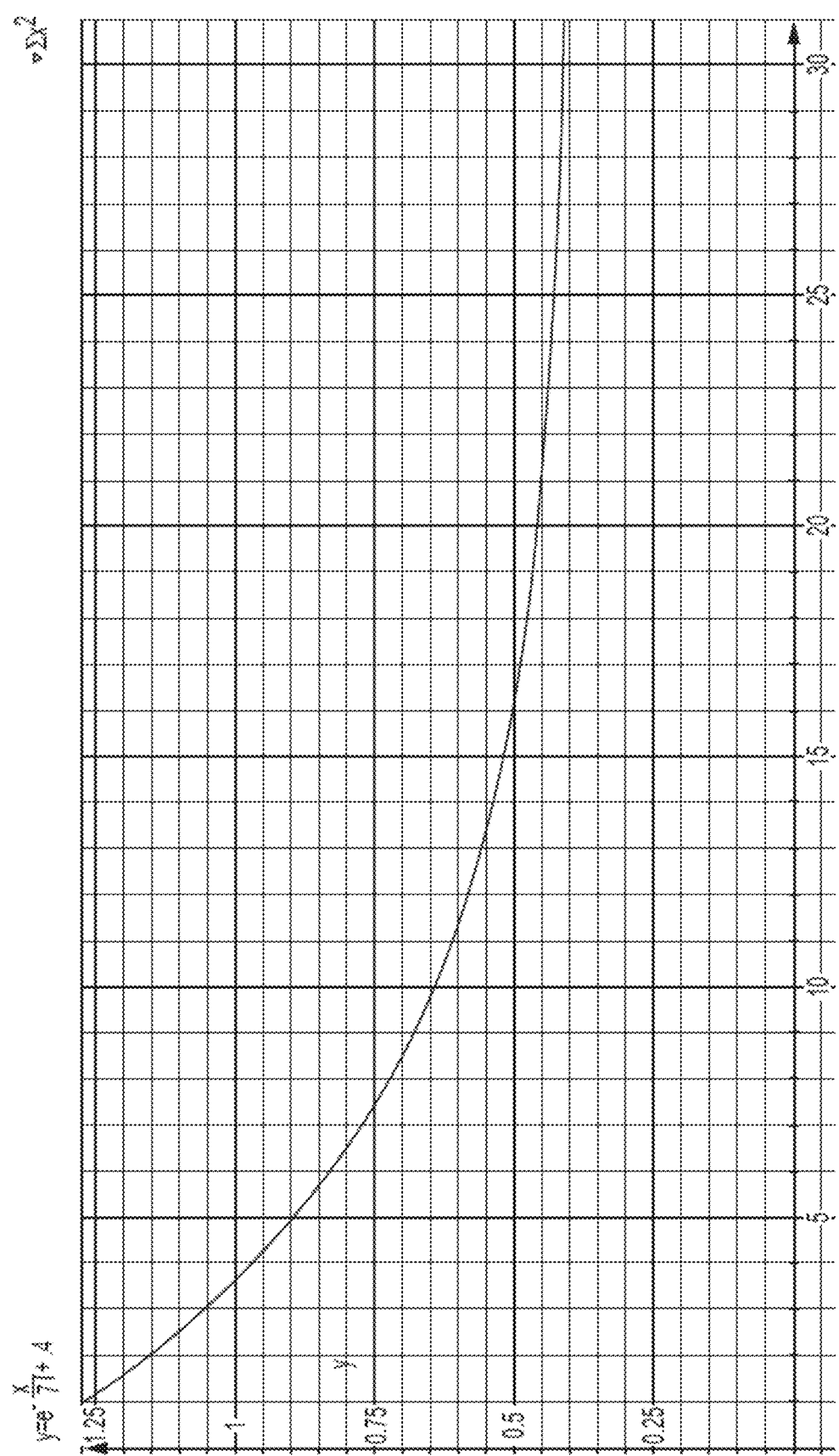
FIG. 37 depicts a radius versus percentage-area-positive curve according to an embodiment of the invention.

Fruit detection could be further improved by checking for partially overlapped fruits and/or differentiating between ripening and new (green) fruits in addition to the circularity check. The purple circles in FIGS. 31, 35, and 36 indicate matched circles that were filtered out based on percentage overlap with empty space based on the curve depicted in FIG. 37 of radius versus percentage-area-positive required to pass (e.g., no circle smaller than a radius of 4 pixels can pass, while large circles need only 40% coverage to pass). This could be further optimized to find a better result for corner cases of circles being over or under filtered out.

Network Communications

The network connection can be directly evaluated in terms of performance of the desired tasks and in real-time. The backend system on the INTEL® EDISON board is set up as a local servers with socket connections to each function and module of the grow unit, which allows for separate forks and processes to run without delaying the system's responsiveness. To measure system responsiveness, Applicant performed trials showing an average delay of 115±20 ms for a round trip, which represents twice the network delay between pressing a button on a smartphone app and seeing the response on the box.

Much care was given to make each module of the backend system as stable as possible. The master controller and scheduler interacts with each subcomponent through server connections and by tracking the process identifier (PID). If anything crashes, a ping timeout is an easy way to check if a program is unresponsive without having to stall the system or risk crashing the controller itself. In the event of temporary network disconnections, the grow unit 102 will continue processing and attempting to reconnect. At some point, it can attempt to restart the system as a second-to-last resort for solving the problem. The last resort can be entering a state in which the grow unit 102 waits for the user to re-show a QR code with connection credentials. This state can be indicated to the user through a set pattern of light flickering or other signals. Kernel modules can be used to ensure the main scheduler program remains live, so that the system can never become "zombied." Between this and the established startup system and connection backup methods, the system core on the INTEL® EDISON board is certainly very robust.

Additional failures could include clogging of the pump system, which would prevent or impair water flow. Clogging could be caused by build-up of salt deposits from nutrients, unclean water, algae, and the like. All the system modules are watertight or separated physically from where any liquid will reside, and even in the case of a water leak, the system will only let water travel to the bottom of the grow unit. Electronics can be placed above the liquid storage tanks and should be safe from any liquids.

Control System

Applicant fabricated a custom printed circuit board (PCB) to interface the INTEL® EDISON™ board with other sensors and actuators such as peristaltic pumps, two water pumps, a fan, an electrical conductivity (EC) sensor, a water level sensor, nutrient level sensors, and an interface to a humiture sensor.

App-Box Communication and User Interface

The goal of this test was to demonstrate the Internet of Things (IoT) enabled functionality of the system. This test combines a simple, user-friendly interface paired with an organized and effective data flow network. The mobile app and system act as clients to a socket server running on an AMAZON EC2® instance. The socket server distinguishes between both clients and relays the data, commands and acknowledgement information as needed. This will show that the system can be controlled from anywhere in the world with an Internet connection.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference.

APPENDIX A

```
{
"_comments": "add off cycle for between grow and bloom stage",
"plantType" : "Tomato",
"numStages" : 3,
"lights" : [
        { "stage" : "sprout",
            "dutyRed" : 100,
            "dutyBlue" : 100,
            "dutyWhite" : 100,
            "timeOn" : 600,
            "timeOff" : 1800
        },
        { "stage" : "grow",
            "dutyRed" : 70,
            "dutyBlue" : 60,
            "dutyWhite" : 50,
            "timeOn" : 300,
            "timeOff" : 2100
        },
        { "stage" : "bloom",
            "dutyRed" : 70,
            "dutyBlue" : 60,
            "dutyWhite" : 50,
            "timeOn" : 600,
            "timeOff" : 1800
        }
    ],
"flood": [
        { "stage" : "sprout",
            "timeOn" : [600, 1100, 1700],
            "timeOff" : [620, 1120, 1720]
        },
        { "stage" : "grow",
            "timeOn" : [300, 800, 1300, 1800],
            "timeOff" : [330, 830, 1330, 1830]
        },
        { "stage" : "bloom",
            "timeOn" : [600, 1100, 1500],
            "timeOff" : [630, 1130, 1530]
        }
    ],
"mixAmounts" : [
        {//sprout stage
            "nutes" : 1,//mL per Liter
            "water" : 1,//Liter? need to do checks to see how much is left
            "duration" : 2 //minutes
        },
```

APPENDIX A-continued

```
    {//grow stage
        "nutes" : 2,//mL per Liter, may change to 3
        "water" : 2,//Liter? need to do checks to see how much is
        left
        "duration" : 4 //minutes
    },
    {//bloom stage
        "nutes" : 4,//mL per Liter
        "water" : 2,//Liter? need to do checks to see how much is
        left
        //and how much it's consumed since the last mix
        "duration" : 4 //minutes
    }
    ]
}
```

TABLE 9

Schedule of Materials for Prototype
APPENDIX B

| Category | Item | Quantity | Notes |
| --- | --- | --- | --- |
| Box Frame | 20 mm 80/20 | 30 | McMaster-Carr Product No. 5537T101 |
|  | Connectors for 80/20 | 40 | McMaster-Carr Product No. 5537T181 |
|  | Fasteners for 80/20 | 80 | McMaster-Carr Product No. 5537T154 |
| Acrylic Sheets | 24" × 48" | 3 | McMaster-Carr Product No. 8650K13 |
|  | 24" × 48" | 2 | McMaster-Carr Product No. 4615T85 |
|  | 24" × 24" | 1 | McMaster-Carr Product No. 9785T522 |
| Door Mechanisms | Threaded Pull Handle | 1 | McMaster-Carr Product No. 1568A71 |
|  | Door Hinge | 1 | McMaster-Carr Product No. 18455A71 |
| Hydroponic System | Flood Tray | 1 | McMaster-Carr Product No. 6840A14 |
|  | Water Reservoir | 1 | Obtained from Amazon.com, Inc. of Seattle, Washington |
|  | Nutrient Reservoirs | 3 | Obtained from Amazon.com, Inc. |
|  | Mixing Reservoir | 1 | McMaster-Carr Product No. 8993T 42 |
|  | 100% Silicon Glue | 1 | Obtained from Hardware Store |
| Tubing | Flood Tubing | 2 | McMaster-Carr Product No. 65 16T29 |
|  | Water Tubing | 2 | Obtained from Amazon.com, Inc. |
|  | Peristatic Tubing | 9 | McMaster-Carr Product No. 5054K313 |
| Tube Fittings | Peristatic Fittings | 6 | McMaster-Carr Product No. 5463K37 |
|  | Flood Fittings | 2 | McMaster-Carr Product No. 53055K523 |
| Peripherals | Peristatic Pumps | 3 | Obtained from Amazon.com, Inc. |
|  | Water Pumps | 2 | Obtained from Amazon.com, Inc. |
|  | Fan | 1 | Obtained from Corsair Components, Inc. of Fremont, California |
|  | Camera | 1 | LIVE! ™ available from Creative Technology Ltd. of Singapore |
|  | Water Level Tape | 1 | Obtained from Adafruit Industries, LLC of New York, New York |
|  | EC Sensor | 1 | Obtained from Amazon.com, Inc. |
|  | Humiture Sensor | 1 | Obtained from Adafruit Industries, LLC |
| Light Array | Aluminum Plate | 1 | McMaster-Carr Product No. 89015K16 |
|  | LEDs | 16 | Obtained from Luxeon Star LEDs of Brantford, Ontario |
| Electronics | Peripheral PCB | 1 | Personal Design produced by Digi-Key Corporation of Thief River Falls, Minnesota |
|  | Power and Lights PCB | 1 | Personal Design produced by Digi-Key Corporation |
|  | INTEL ® EDISON ™ with ARDUINO ® Breakout Board | 1 | Obtained from Newegg.com Inc. of City of Industry, California |

The invention claimed is:

1. A system comprising:
a camera;
one or more light sources; and
a controller programmed to:
receive an image of one or more plants from the camera;
apply a segmentation algorithm to produce a binary image from the image;
apply a thresholding algorithm to classify the one or more plants within the binary image as being in one or several stages of plant life; and
control operation of the one or more light sources based on a classified stage of plant life including controlling operation of the one or more light sources to:
expose the one or more plants to darkness for 36 hours to induce a transition to a flowering stage; and
expose the one or more plants to one or more selected from the group consisting of: a high ratio of at least 75% red light prior to the darkness and a low ratio of 25% or less red light after the darkness.

2. The system of claim 1, wherein the controller is further programmed to control operation of the one or more light sources to apply more blue light than red light during an early stage of plant life selected from the group consisting of: planted, sprouted, and growing.

3. The system of claim 2, wherein the blue light includes a wavelength of about 450 nm.

4. The system of claim 1, wherein the controller is further programmed to control operation of the one or more light sources to apply more red light than blue light during an late stage of plant life selected from the group consisting of: flowering, fruiting, and ripe.

5. The system of claim 4, wherein the red light includes a wavelength of about 650 nm.

6. The system of claim 1, wherein the controller is programmed to control the one or more light sources to generate a high ratio of at least 75% red light prior to the darkness.

7. The system of claim 1, wherein the controller is programmed to control the one or more light sources to generate a low ratio of 25% or less red light after the darkness.

8. The system of claim 1, wherein the one or more light sources include one or more blue LEDs and one or more red LEDs.

9. The system of claim 1, wherein the segmentation algorithm is a binary segmentation algorithm.

10. The system of claim 9, wherein the binary segmentation algorithm is Otsu's method.

11. The system of claim 9, wherein the binary segmentation algorithm is a watershed method.

12. The system of claim 1, further comprising:
one or more pumps adapted and configured to apply one or more fluids to the one or more plants;
wherein the controller is further programmed to control one or more pumps based on the classified stage of plant life.

13. The system of claim 12, further comprising:
a flood tray in communication with the one or more pumps, the flood tray adapted and configured to receive the one or more plants and the one or more fluids.

14. The system of claim 1, wherein the controller is further programmed to:
send alerts to a user.

15. The system of claim 14, wherein the alerts relate to needed user interventions.

16. The system of claim 14, wherein the alerts include alerts regarding low fluid levels.

17. The system of claim 14, wherein the alerts are directed to a user's smartphone.

18. A computer-implemented method of growing plants, the computer-implemented comprising:
receiving an image of one or more plants from a camera;
applying a segmentation algorithm to produce a binary image from the image;
applying a thresholding algorithm to classify the one or more plants within the binary image as being in one or several stages of plant life; and
controlling operation of one or more light sources based on a classified stage of plant life including controlling operation of the one or more light sources to:
expose the plant to darkness for 36 hours to induce a transition to a flowering stage; and
expose the one or more plants to one or more selected from the group consisting of: a high ratio of at least 75% red light prior to the darkness and a low ratio of 25% or less red light after the darkness.

* * * * *